(12) United States Patent
Richard

(10) Patent No.: US 10,308,307 B2
(45) Date of Patent: Jun. 4, 2019

(54) DISK-TYPE ELECTRIC MOTOR, ELECTRICALLY DRIVEN VEHICLE AND METHOD FOR CONTROLLING THE SAME

(71) Applicant: ALLIED TREASURE INC, LIMITED, Kowloon (CN)

(72) Inventor: Chi-Hsueh Richard, Kowloon (CN)

(73) Assignee: ALLIED TREASURE INC., LIMITED, Kowloon (CN)

( * ) Notice: Subject to any disclaimer, the term of this patent is extended or adjusted under 35 U.S.C. 154(b) by 29 days.

(21) Appl. No.: 15/429,189

(22) Filed: Feb. 10, 2017

(65) Prior Publication Data

US 2017/0233025 A1    Aug. 17, 2017

Related U.S. Application Data

(60) Provisional application No. 62/295,508, filed on Feb. 16, 2016, provisional application No. 62/376,412, filed on Aug. 18, 2016.

(51) Int. Cl.
*B62K 11/04* (2006.01)
*H02K 11/33* (2016.01)
(Continued)

(52) U.S. Cl.
CPC .............. *B62K 11/04* (2013.01); *B62M 7/02* (2013.01); *H02K 1/02* (2013.01); *H02K 7/006* (2013.01); *H02K 11/33* (2016.01); *H02K 21/16* (2013.01); *H02K 21/24* (2013.01); *H02P 6/182* (2013.01); *H02P 6/26* (2016.02); *B62K 2202/00* (2013.01);
(Continued)

(58) Field of Classification Search
CPC ........ H02K 21/24; H02K 1/02; H02K 1/2793; H02K 2201/03; H02K 23/04; H02K 15/03; H02K 17/04; H02K 21/042; H02P 6/182; H02P 2101/45; B62K 11/04; B62K 2202/00
See application file for complete search history.

(56) References Cited

U.S. PATENT DOCUMENTS 5,041,749 A * 8/1991 Gaser ...................... H02K 21/16
                                                               310/156.22
5,670,836 A * 9/1997 Horst ...................... H02K 21/16
                                                               310/156.15
(Continued)

FOREIGN PATENT DOCUMENTS

CN            1503435 A        6/2004
CN          102055251 A        5/2011
(Continued)

*Primary Examiner* — Thai T Dinh
(74) *Attorney, Agent, or Firm* — Chieh-Mei Wang

(57) ABSTRACT

The present disclosure relates to a disk-type brushless direct current (BLDC) motor, which comprises a magnetic rotor and a stator. The magnetic rotor is provided with a rim and a plurality of equally spaced magnetic poles around the rim in circumferential direction. The stator is provided with a stator core having tooth portions and boot portions and a plurality of coil windings wrapped around the tooth portions. The stator is disposed radially in relation to the magnetic rotor such that the magnetic poles are radially polarized to produce radial magnetic flux density, and the magnetic flux density is substantially higher at both edges than middle portion of each magnetic pole in the circumferential direction.

20 Claims, 31 Drawing Sheets

(51) Int. Cl.
  *H02K 1/02* (2006.01)
  *H02K 21/24* (2006.01)
  *H02P 6/182* (2016.01)
  *B62M 7/02* (2006.01)
  *H02K 21/16* (2006.01)
  *H02K 7/00* (2006.01)
  *H02P 6/26* (2016.01)

(52) U.S. Cl.
  CPC ...... *B62K 2204/00* (2013.01); *B62K 2208/00* (2013.01); *H02K 2201/03* (2013.01)

(56) References Cited

U.S. PATENT DOCUMENTS

| | | | | |
|---|---|---|---|---|
| 6,727,630 B1 * | 4/2004 | Maslov | ............ | H02K 1/141 310/156.01 |
| 7,242,160 B2 * | 7/2007 | Wang | ............ | H02P 6/185 318/400.11 |
| 7,394,174 B2 * | 7/2008 | Blase | ............ | F02M 37/08 310/156.05 |
| 7,439,642 B2 * | 10/2008 | Chen | ............ | H02K 29/08 310/68 B |
| 8,222,777 B2 * | 7/2012 | Loussert | ............ | H02K 11/01 310/156.62 |
| 8,987,964 B2 * | 3/2015 | Achor | ............ | F02M 37/08 29/598 |
| 2008/0055032 A1 * | 3/2008 | Miyata | ............ | H02K 1/278 335/306 |
| 2008/0197794 A1 * | 8/2008 | Vermeir | ............ | H02P 6/085 318/400.06 |
| 2008/0246424 A1 * | 10/2008 | Takeuchi | ............ | H02K 21/16 318/400.17 |
| 2010/0194508 A1 * | 8/2010 | Hagiwara | ............ | C25D 3/16 335/302 |
| 2014/0103773 A1 * | 4/2014 | Yang | ............ | H02K 21/24 310/156.48 |
| 2014/0139079 A1 * | 5/2014 | Kato | ............ | H02K 21/16 310/68 B |
| 2015/0054437 A1 * | 2/2015 | Oomura | ............ | H02P 6/002 318/400.06 |
| 2015/0204925 A1 * | 7/2015 | Hernandez | ............ | G01R 27/02 702/65 |

FOREIGN PATENT DOCUMENTS

| | | |
|---|---|---|
| CN | 103493337 A | 1/2014 |
| CN | 103762759 A | 4/2014 |
| EP | 1292002 A | 3/2003 |
| JP | 2007-306798 A | 11/2007 |
| JP | 2010-284021 A | 12/2010 |

\* cited by examiner

DISK-TYPE ELECTRIC MOTOR, ELECTRICALLY DRIVEN VEHICLE AND METHOD FOR CONTROLLING THE SAME

FIELD

The disclosure relates to an electric motor, in particular, to a disk-type BLDC motor which can be applied to an electrically driven vehicle to provide high output torque.

BACKGROUND

Conventional cylinder type radial flux motors can operate with high speed and low torque. However, when the motor operates to drive a vehicle which needs high loading capability such as carrying heaviness, climbing a sloping surface, or start moving, the output torque can be enhanced only by increasing the input electrical power. If the high torque is required frequently, to maintain the operation with high input power consumes much electricity and shortens the range of the vehicles.

BRIEF DESCRIPTION OF THE DRAWINGS

Implementations of the disclosure will now be described, by way of examples only, with reference to the attached figures.

DETAILED DESCRIPTION

The disclosure is directed to a brushless direct-current (BLDC) electric motor. The BLDC motor can be used in an electrically driven vehicle. The BLDC electric motor has a fixed stator and a rotatable rotor. According to the direction of magnetic flux for operation, BLDC motors can be further divided into radial flux motors and axial flux motors.

Figure 1:
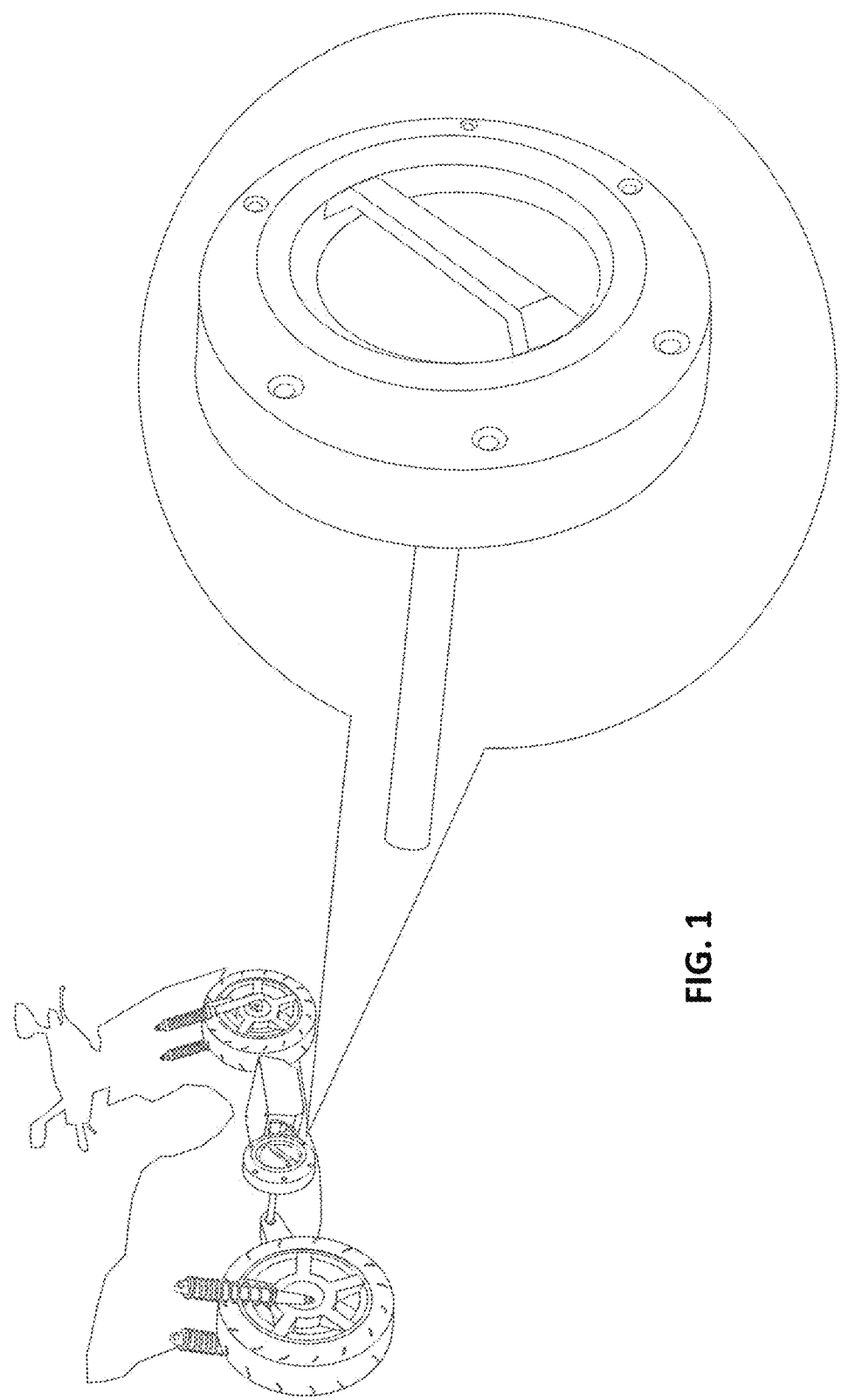
FIG. 1 is the perspective representation of an electrically driven vehicle according to one embodiment of the disclosure.

In one embodiment of the disclosure, the electric motor is a radial flux motor having a disk-like shape and therefore, the motor with disk-like shape is referred to as a disk-type motor. FIG. 1 shows a perspective representation of the electrically driven two-wheeled vehicle, which has a steerable front wheel, a battery system, and a rear wheel driven by the disk-type motor that is connected to the rear wheel via a transmission.

Figure 2:
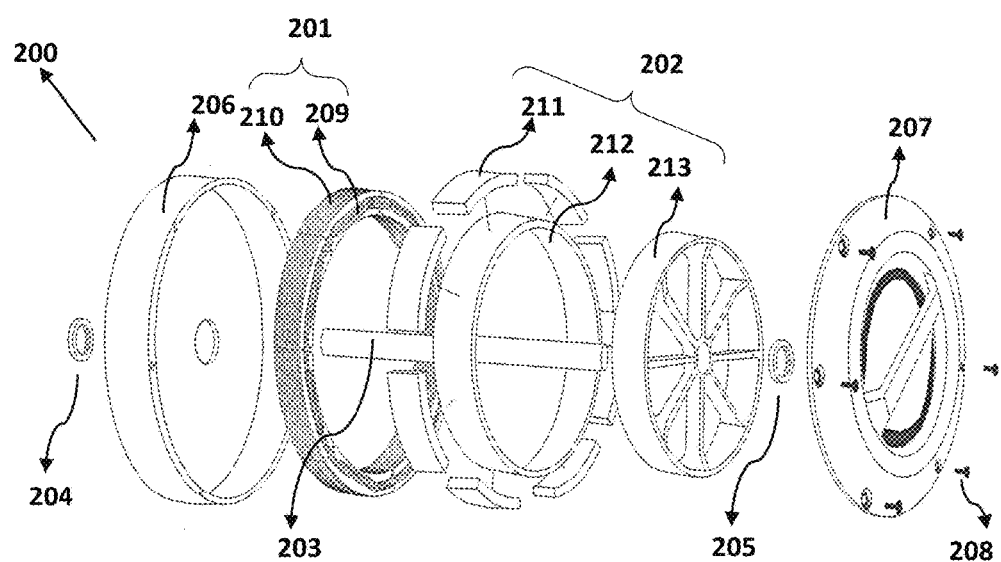
FIG. 2 shows major components of a disk-type motor according to one embodiment of the disclosure.

In FIG. 2, the disk-type motor 200 comprises a stator 201, a rotor 202, a drive shaft 203, a back case 206 and a front case 207, wherein the rotor 202 is disposed and oriented radially to the stator 201. The front case 207 is fastened to the back case 206 with screws 208 to make a housing capable of holding the rotor 202 and stator 201 inside thereof. Bearings 204 and 205 are used for constraining the rotation of the drive shaft during operation. The stator 201 comprises a stator core 210 and a plurality of coil windings 209, and the rotor 202 comprises more than one permanent magnet 211, a rim 212 and a rim support 213. Therefore, a motor can be referred to as a disk-type motor when the radial diameter of the rotor is larger than its axial thickness while a motor can be referred to as a cylinder-type motor when the radial diameter of the rotor is smaller than its axial thickness.

In operation of the motor 200, the stator 201 stays fixed and produces a time-varying electromagnetic field according to the current flow provided into the coil windings. The rotor rotates along the circumferential direction via permanent magnets 211 propelled by the electromagnetic field such that the drive shaft 203 rotates with the rotor. In other words, the electromagnetic field produced by conducting coil windings interacts with magnetic flux density of the permanent magnets, thus propelling the permanent magnets on the rotor.

Figure 3:
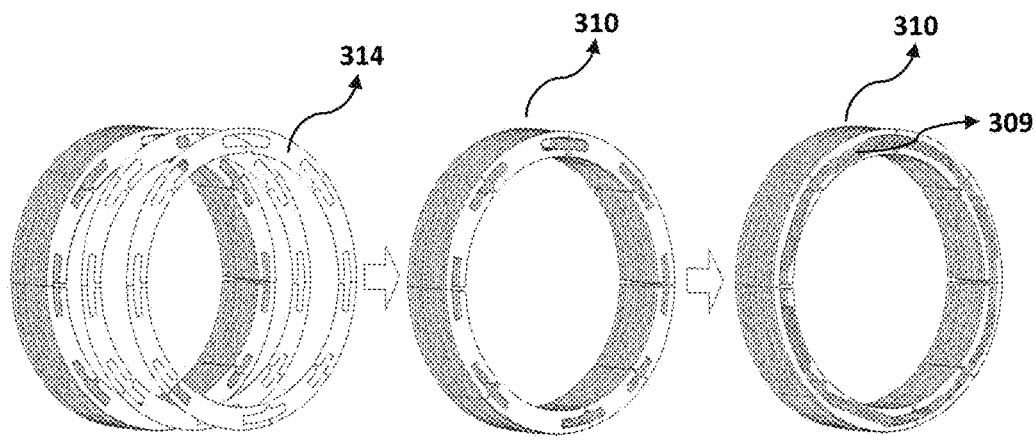
FIG. 3 shows a stator of a disk-type motor according to one embodiment of the disclosure.

In FIG. 3, the stator core 310 can be made of by stacking a plurality of laminated steel sheets 314. The steel sheets 314 are usually provided with the materials of high magnetic permeability and low magnetic loss (e.g. silicon steel). The coil windings 309 are provided with conductive wires wrapped around tooth portions of the stator core. The tooth portions will be described in detail with reference to FIG. 12.

Figure 4:
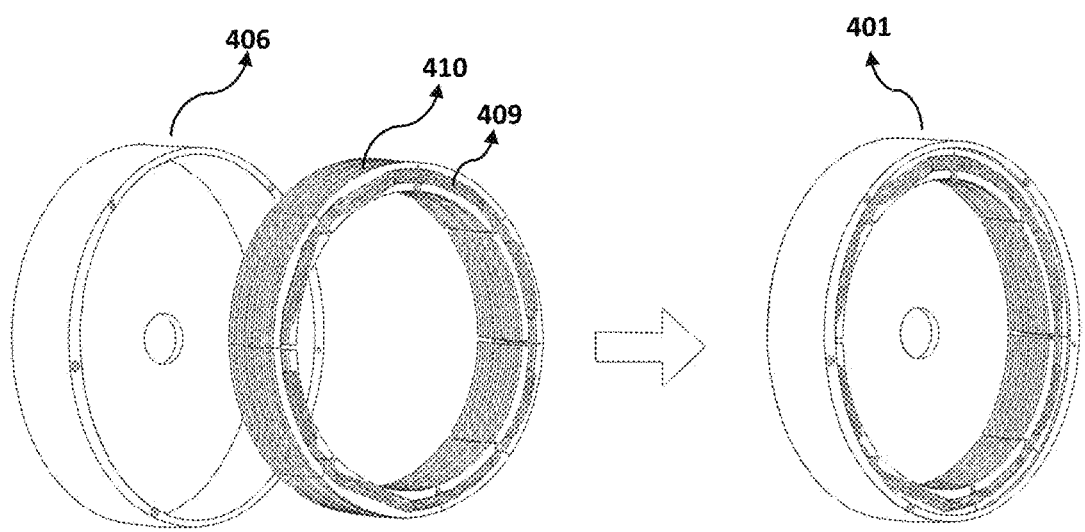
FIG. 4 shows a back case holding a stator of a disk-type motor according to one embodiment of the disclosure.

FIG. 4 shows that the stator entirety that includes the coil windings is mounted into the back case 406. The back case 406 usually can be made of by a low permeability material (e.g. aluminum alloy) which functions to prevent the magnetic flux from leaking out of the motor. In addition to the material properties, the weight of each motor component is of concern for better motor operation.

Figure 5:
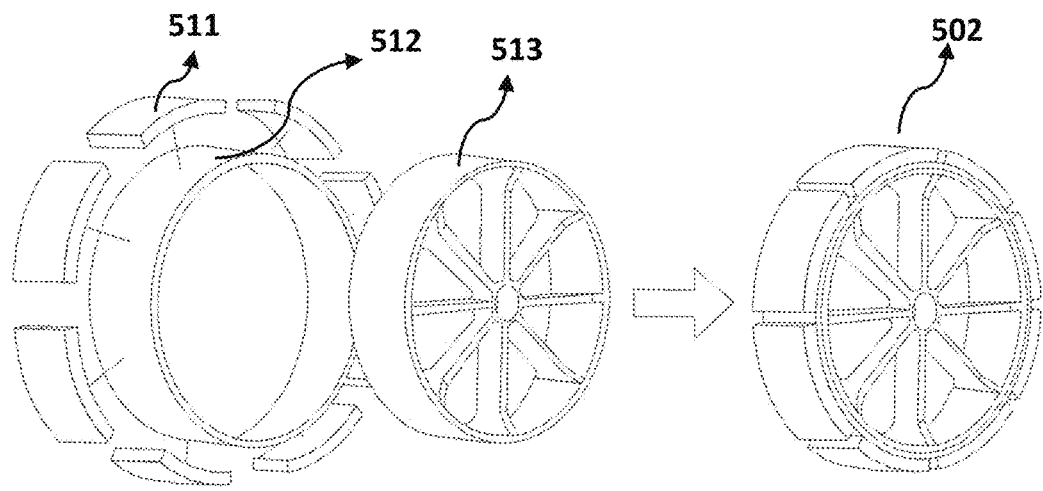
FIG. 5 shows a rotor of a disk-type motor according to one embodiment of the disclosure.

FIG. 5 shows that the rotor 502 is provided with more than two juxtaposed permanent magnets 511, a rim 512 which the magnets 511 are equally spaced around and a rim support 513 that is closely engaged to the rim for supporting. The materials for permanent magnets contain neodymium (Nd), iron (Fe) and Boron (B), and additional materials can be added into the magnets to obtain the requisite magnetic characteristics.

Figure 6A:
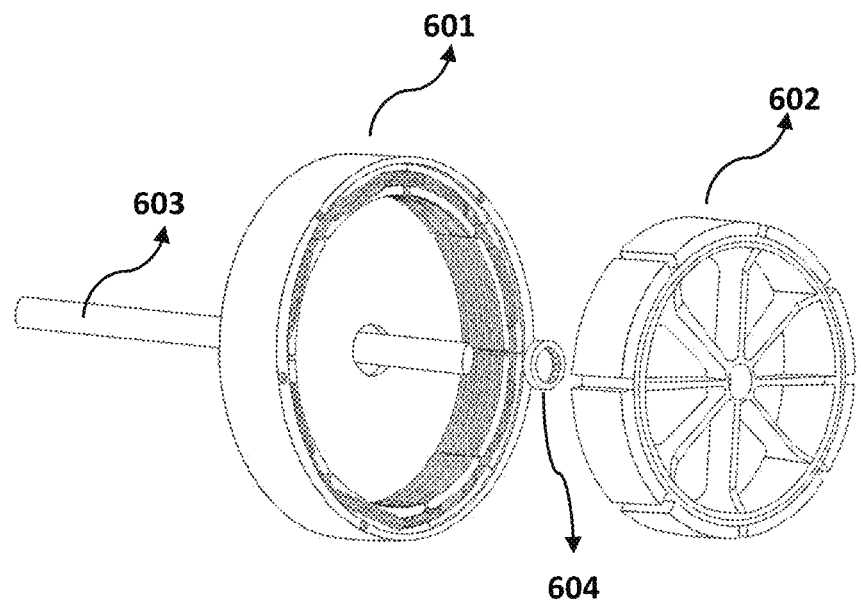
FIGS. 6A and 6B show an assembly of a rotor, a stator and a drive shaft according to one embodiment of the disclosure.

In FIG. 6A, the rotor 602 is mounted into interior space of the stator 601 with the drive shaft 603 inserted to the center of the rotor and constrained by the bearing 604. The drive shaft 603 can be provided with materials of high toughness and abrasion resistance, such as high carbon steel. The assembly as illustrated in FIG. 6A is shown in FIG. 6B.

Figure 6B:
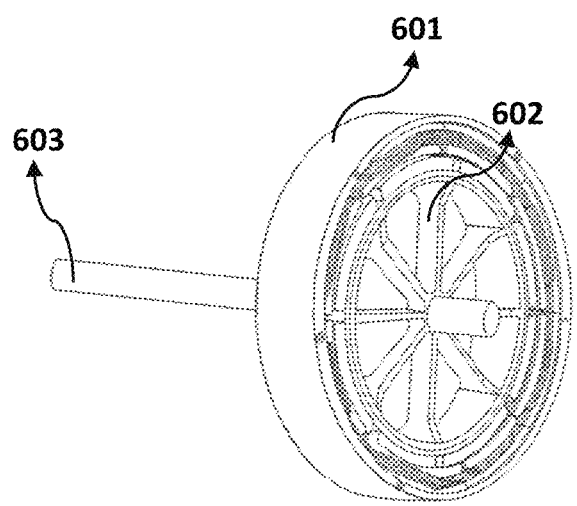
Figure 7:
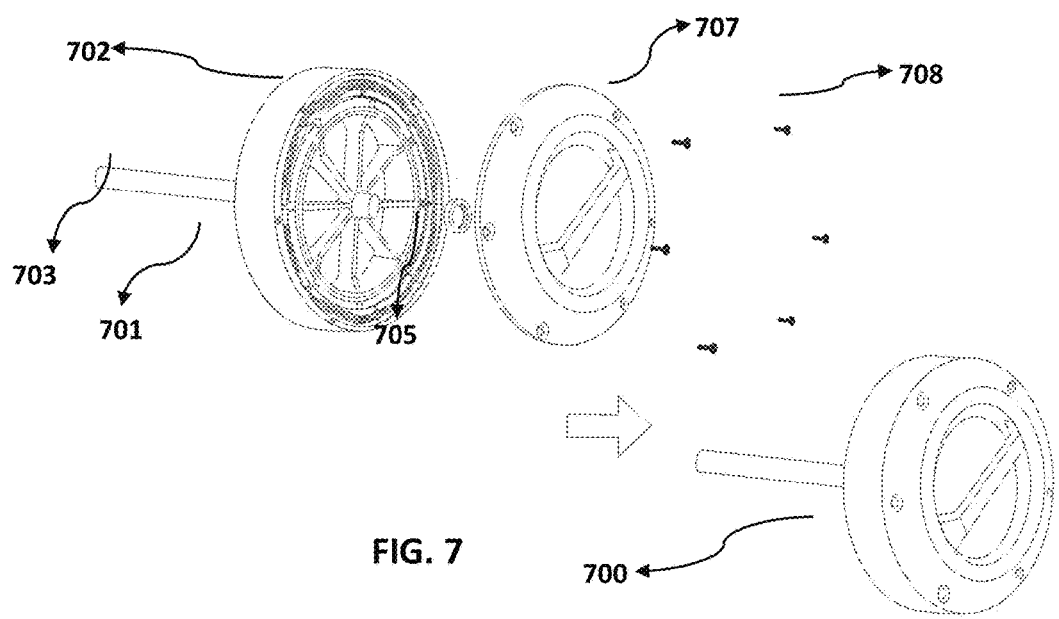
FIG. 7 shows a completed assembly of a disk-type motor according to one embodiment of the disclosure.

FIG. 7 shows that the assembly in FIG. 6B is further covered by the front case 707, and the drive shaft 703 is engaged via another bearing 705. The motor 700 is assembled completely via the combination as shown in FIG. 7.

Figure 8A:
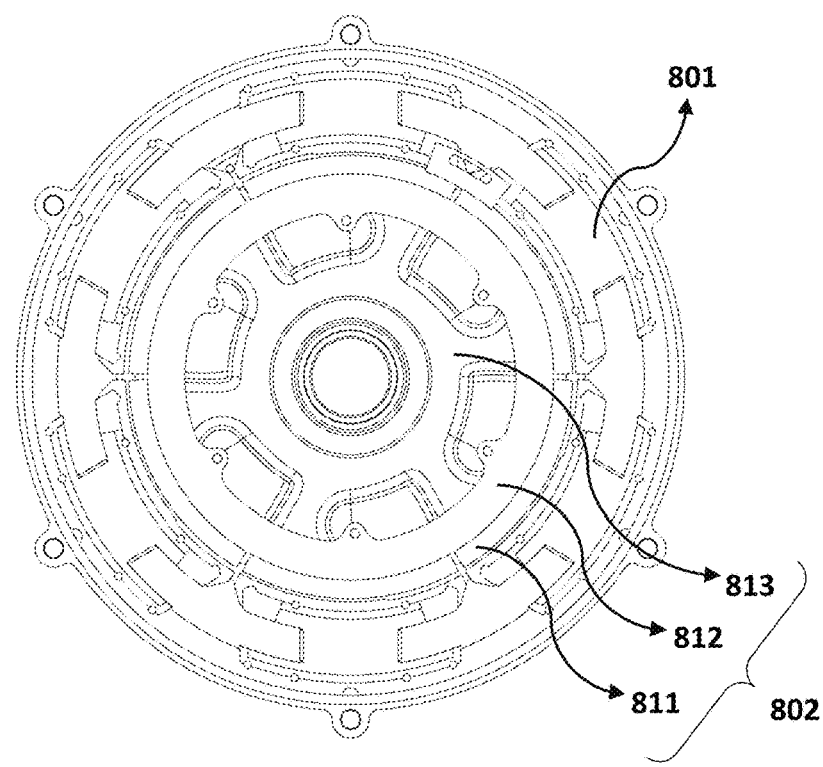
FIGS. 8A and 8B are side views for internal-rotor configuration and external-rotor configuration.
Figure 8B:
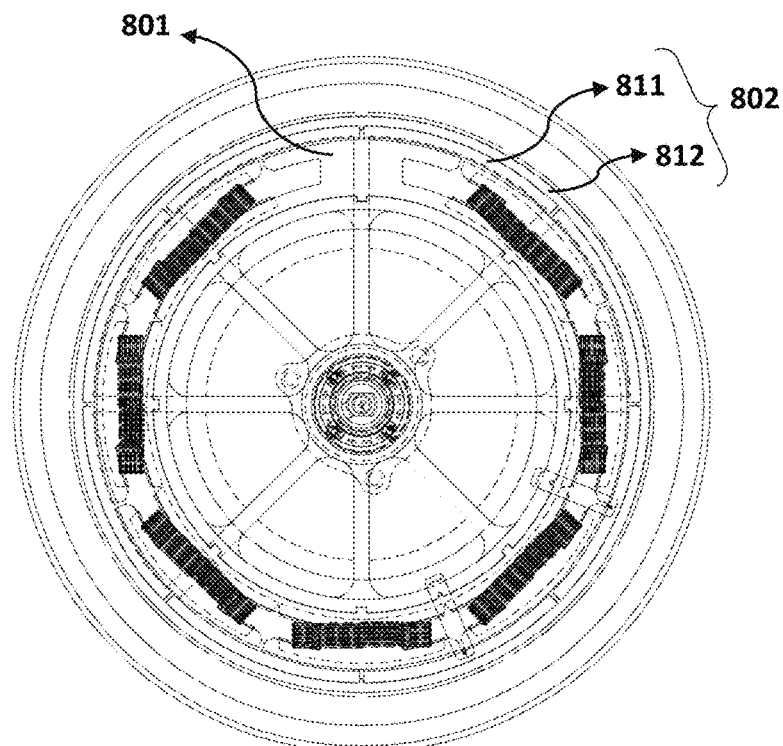

In one embodiment of the disclosure, the motor is configured to have the rotor disposed radially inward of the stator as shown in FIGS. 2 to 7; such configuration of the motor is referred to an internal-rotor radial flux motor. FIG. 8A shows an internal-rotor radial flux motor, in which the rotor 802 is disposed radially inward of the stator 801. In another embodiment of the disclosure, the motor that has the rotor disposed radially outward of the stator is referred to an external-rotor radial flux motor. FIG. 8B shows an external-rotor radial flux motor, in which the rotor 802 is disposed radially outward of the stator.

Figure 9A:
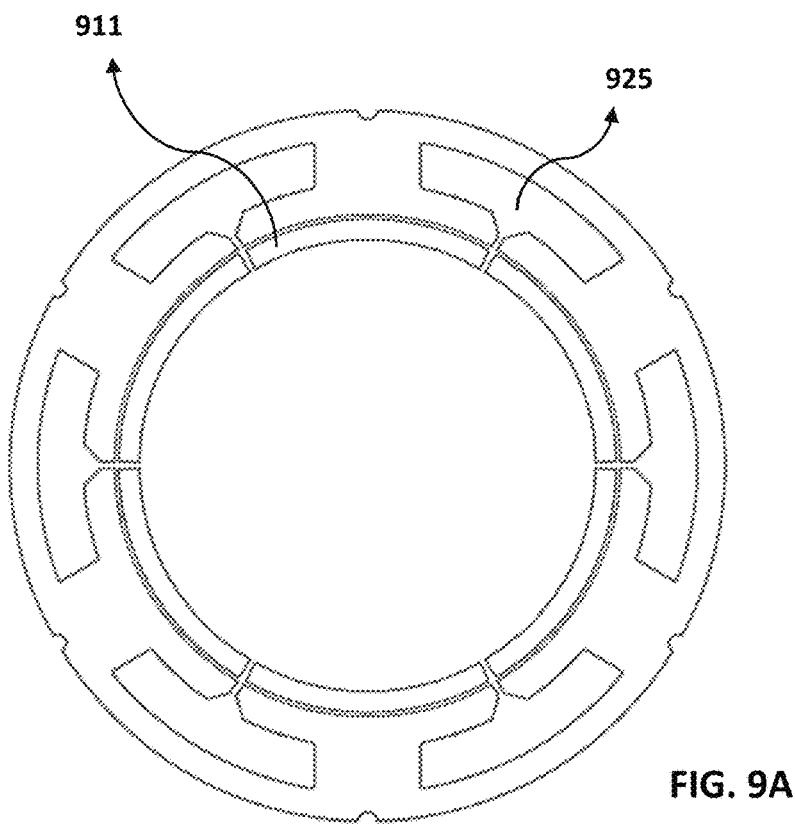
FIGS. 9A and 9B show two arrangements for poles and slots.

In a motor, the permanent magnets are referred to as poles and the space between two adjacent coil windings is referred to as a slot. In one embodiment of the disclosure, to achieve high torque without the range being substantially shortened for electrically driven vehicles, the disk-type motor is preferred to be controlled by a single-phase control scheme. A disk-type motor controlled by a single-phase control scheme can be referred to as a single-phase controlled motor system which at least includes a disk-type motor and a single-phase control circuit. For the single-phase controlled motor system, the number of poles is preferably equal to that of slots (i.e., the number of poles and coil windings is equal). The configuration of equal number of poles and slots has an advantage that high efficiency of the motor operation can be attained because every pole is paired with one coil winding to generate a torque. FIG. 9A shows the configuration of equal number of poles 911 and slots 925, both of which are six.

Figure 9B:
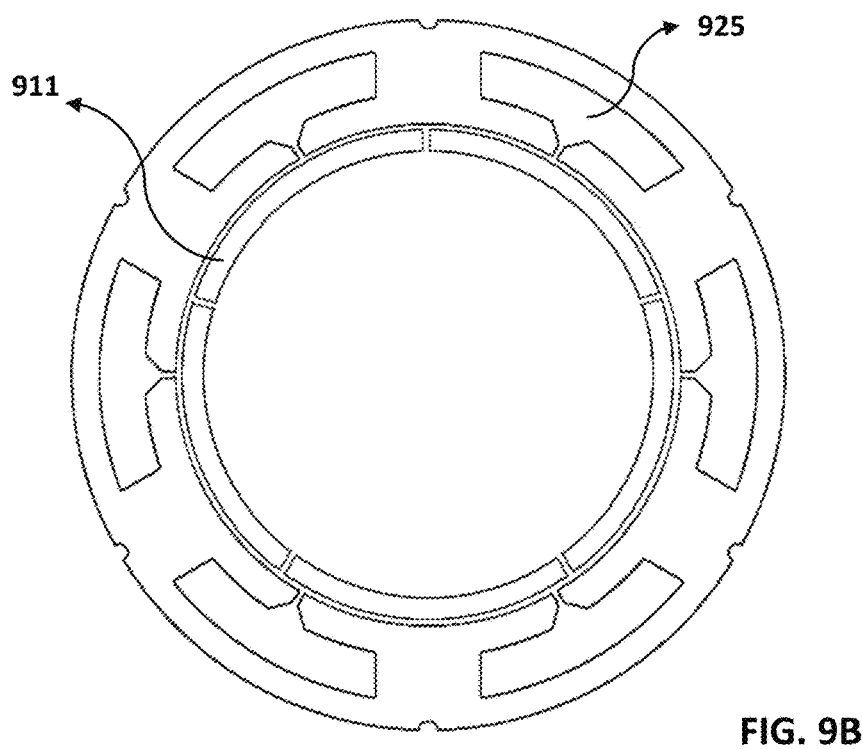

In another embodiment of the disclosure, the single-phase controlled motor system can be applied in conjunction with the configuration that the number of poles differs from that of slots. FIG. 9B shows this configuration with five poles 911 to six slots 925.

Figure 10A:
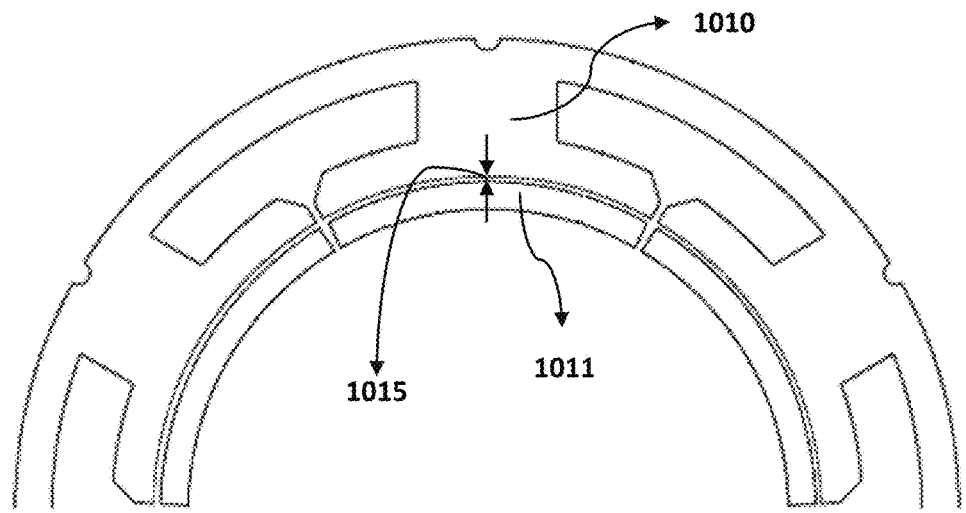
FIGS. 10A and 10B show two geometrical shapes of air gap between a permanent magnet and a stator core.

FIG. 10A shows the geometrical diagram of a rotor and a stator, in which air gap 1015 between the permanent magnet 1011 and the stator core 1010 has substantially the same width along the circumferential direction. As the single-phase control scheme is used to operate the motor with air gaps of same width, the rotational direction at initial will be indefinite, i.e., it is even likely that the rotor would rotate clockwise or counter-clockwise after the time-varying magnetic field is turned on.

Figure 10B:
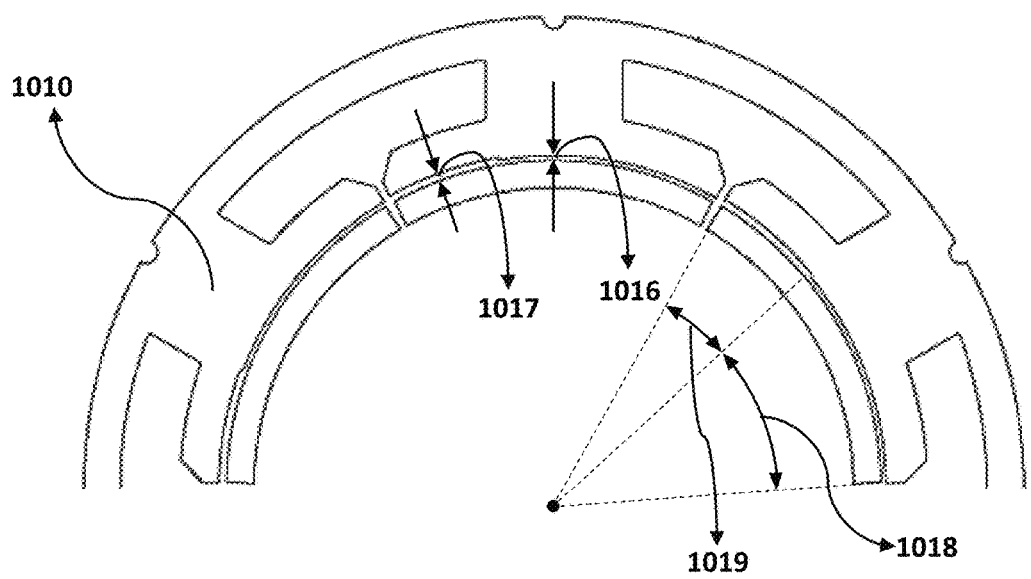

To ensure the rotation starts in the desired direction, width of air gap and its corresponding arc length can be modified jointly. FIG. 10B illustrates the exemplary modification of air gap and its corresponding arc length. In FIG. 10B, two different widths for air gap are provided, that is, a first gap 1016 and a second gap 1017 which is wider than the first gap 1016. A first arc length 1018 corresponding to the first gap 1016 is longer than a second arc length 1019 corresponding to the second gap 1017.

For the single-phase controlled motor system, the discontinuity of air gap width is necessary in favor of same rotational direction of the rotor. The rotational direction can be determined by the designs of gaps and their corresponding arc lengths. Basically, the second gap 1017 is necessarily wider than the first gap 1016, giving rise to at least two magnitudes of magnetic field acting on the same permanent magnets, and the first arc length 1018 is longer than the second act length 1019 such that the motor rotation can be maintained in one direction during operation. For example, the second gap 1017 can be as twice wider as the first gap 1016 and the first arc length 1018 can be as twice longer as the second arc length 1019.

Figure 11A:
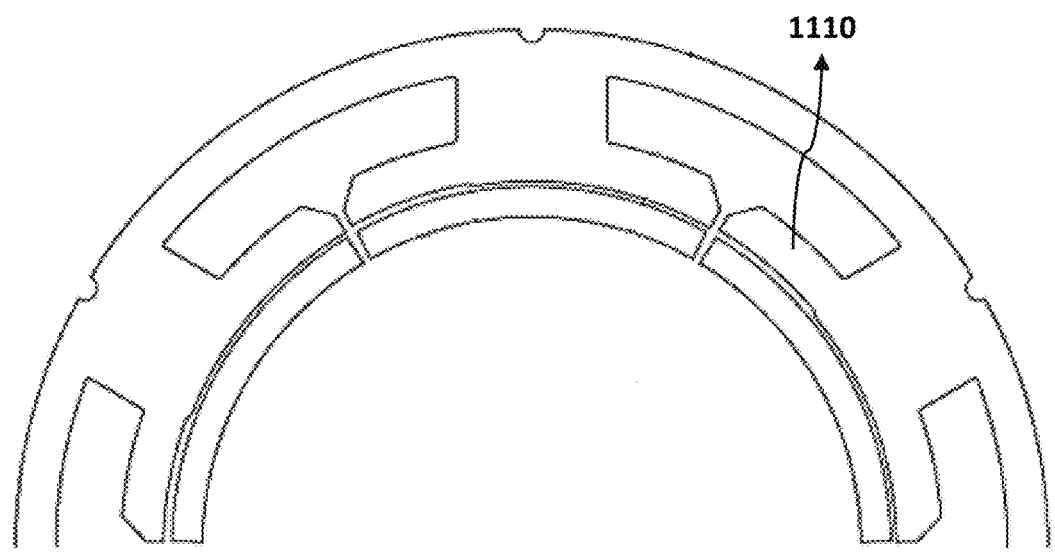
FIGS. 11A and 11B show two implementations for air gap modification.
Figure 11B:
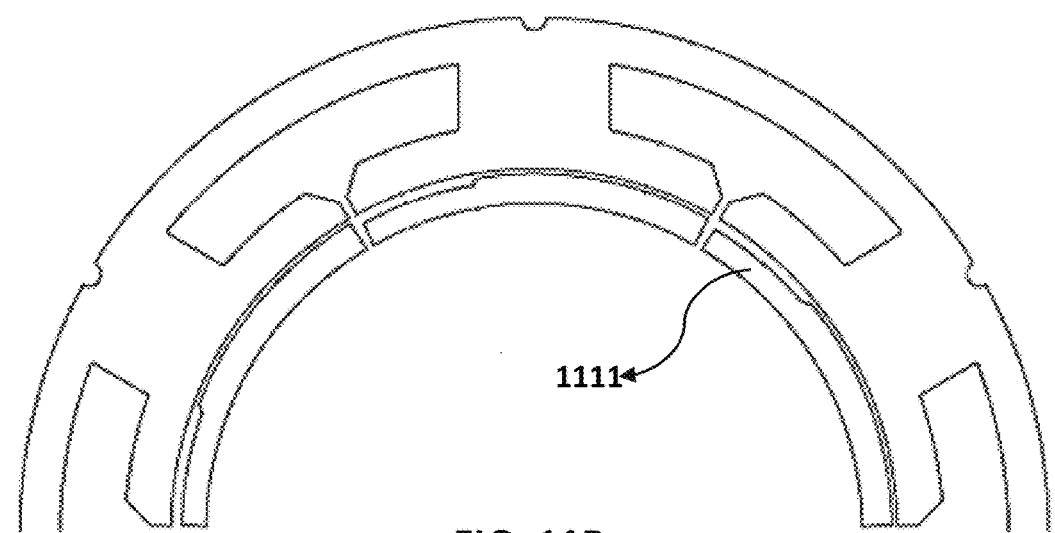

Two implementations for gap discontinuity as shown in FIG. 10B are illustrated in FIGS. 11A and 11B, respectively. FIG. 11A shows that the gap modification can be carried out on the stator core 1110; FIG. 11B shows that the gap modification can be carried out on the permanent magnets 1111.

Figure 12:
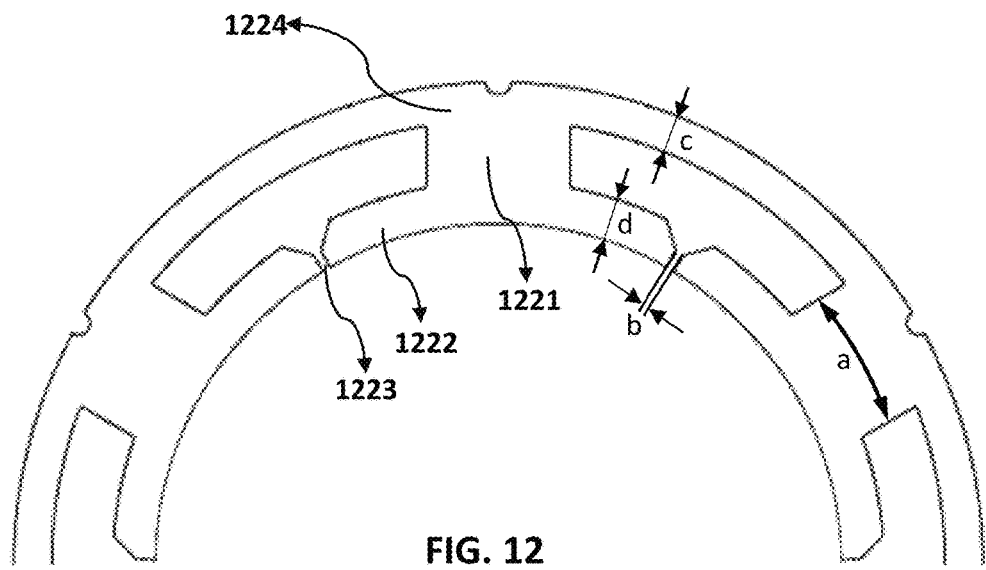
FIG. 12 shows a geometrical shape of a stator core according to one embodiment of the disclosure.

The geometry of the stator core is illustrated in detail with reference to FIG. 12. As shown in FIG. 12, the stator core 1210 comprises yoke portion 1224 having thickness of c, tooth portion 1221 having thickness of a, and boot portion 1222 having thickness of d. The air opening between two neighboring boot portions can be referred to as a slot opening 1223 which tends to be made as small as possible. As the slot openings are made small, the boot portion each gets laterally wider in the circumferential direction such that the electromagnetic field produced by the coil windings has larger active interface area that covers the poles. As a result, the rotational torque is enhanced.

The conductive wires are wound primarily around the tooth portion 1221 as coil windings for the motor. In operation, current in the coil windings induces electromagnetic field that penetrates the stator core substantially in two directions: one from the yoke portion 1224 through the tooth portion 1221 toward the boot portion 1222, and the other from the boot portion 1222 back through the tooth portion 1221 toward the yoke portion 1224. Thus, the tooth portion 1221 typically needs to have thickness large enough to sustain the magnetic flux coming from the yoke portion 1224 or the boot portion 1222 in avoidance of overheating thereof. Since most of the magnetic flux is directed from both sides of yoke portion 1224 (or from both side of boot portion 1222) into the tooth portion 1221, the tooth portion 1221 can be at least two times thicker than the yoke portion 1224 or of the boot portion 1222, i.e., the ratio of a to c (or a to d) is about 2.

Moreover, in one embodiment of the disclosure, specific NdFeB permanent magnets can be applied to the single-phase controlled motor system such that the operational magnetic field created by the coil windings can be reduced for operation. In this manner, the magnetic flux passing through the tooth portion is decreased due to the specific NdFeB permanent magnets, and thus the tooth portion can have thinner thickness for sustaining the flux without overheating. Therefore, the thickness ratio of tooth portion 1221 to yoke portion 1224 can be decreased to be, for example, smaller than two. Furthermore, the thinner tooth portion results in lighter stator core and larger slots. The larger slot further allows more wires to be wounded around the tooth portion, and thus the lower current suffices to produce the desired magnetic field compared to the smaller slot.

In addition, the thickness d of boot portion 1222 is made large enough to sustain the highest flux density of the specific NdFeB magnets, thereby reducing overheating effect due to magnetic saturation.

The motors using conventional rare-earth magnets (R—Fe—B magnets; R is a rare earth element) as poles for a motor cannot produce sufficient torque especially for climbing a sloping surface, carrying heaviness, etc. In addition, the motor operation inevitably generates heat, thereby raising the temperature over the entire motor system. In high temperatures, coercivity of the rare-earth magnets tends to decrease, making the magnets more easily lose magnetism. Also, remanence and energy product of a magnet can be affected adversely by high temperatures.

On the contrary, the specific NdFeB magnets used in one embodiment of the disclosure have a specific crystal structure that can enhance the magnetic properties. The coercivity, remanence, energy product or the combination thereof are higher for the specific NdFeB magnets in a normal condition. The resistance of the coercivity to temperature becomes better; the remanence and/or energy product is less affected by temperature.

Figure 13:
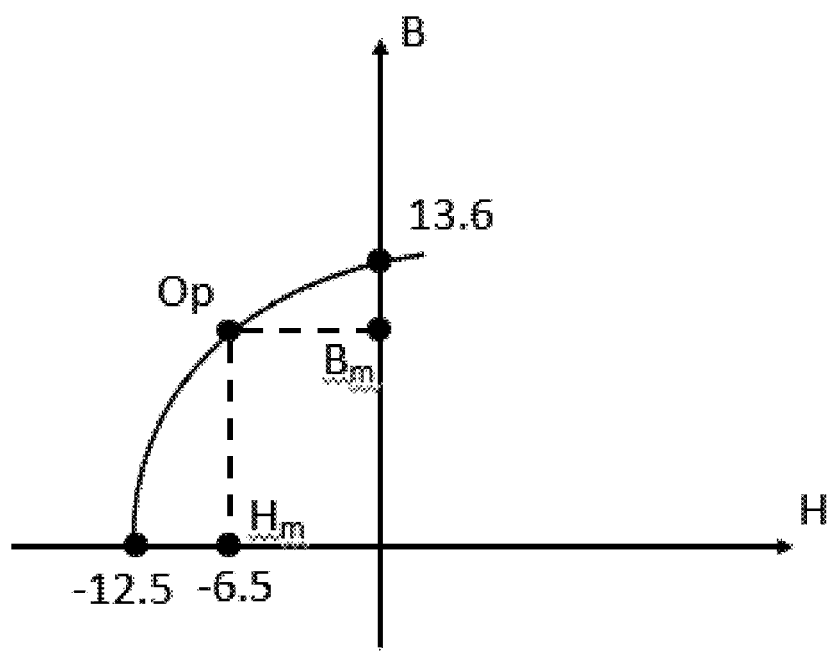
FIG. 13 shows a hysteresis curve of a NdFeB permanent magnet according to one embodiment of the disclosure.

FIG. 13 shows the hysteresis curve of the specific NdFeB magnets employed in one embodiment of the disclosure. In the hysteresis curve, symbol H represents the externally-applied magnetic field strength (unit: KOe, kilo-Oersted) in X axis and symbol B represents the magnetic flux density (unit: kG, kilo-Gauss) in Y axis. It is apparent that the specific NdFeB magnet has remanence of 13.6 kG and coercivity of 12.5 KOe. The operational point can be set to the applied field strength H of −6.5 KOE.

Figure 14:
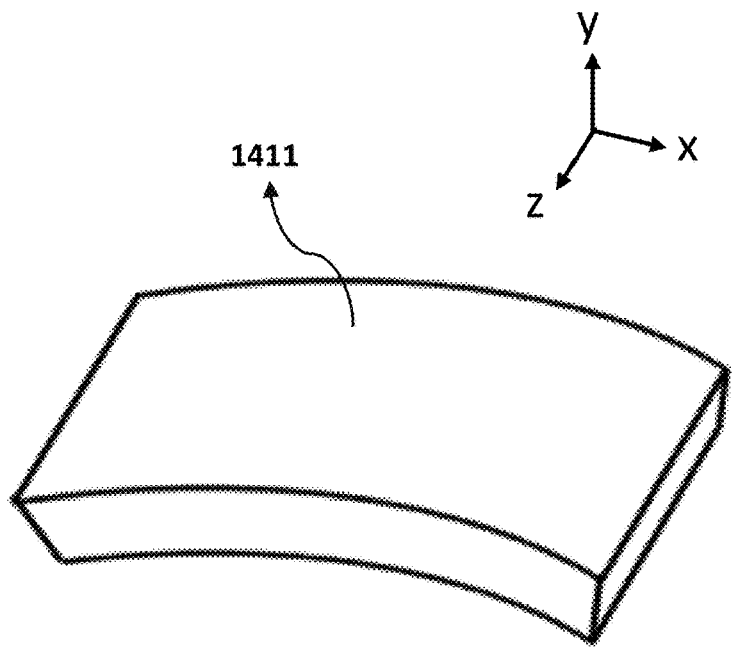
FIG. 14 shows the geometry of a NdFeB permanent magnet as a pole for a disk-type motor according to one embodiment of the disclosure.
Figure 15:
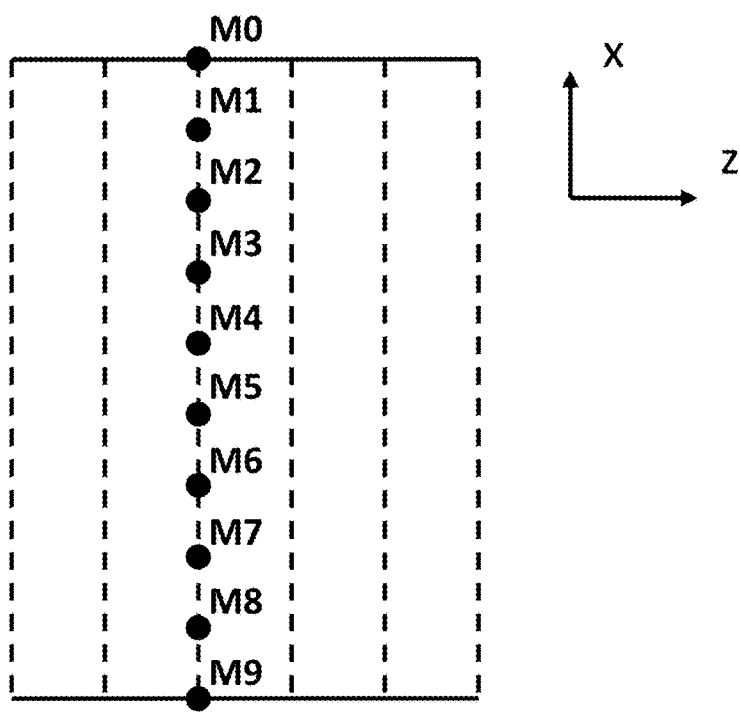
FIG. 15 shows sampling points for the measurement of radial magnetic flux density on a NdFeB magnet.
Figure 16:
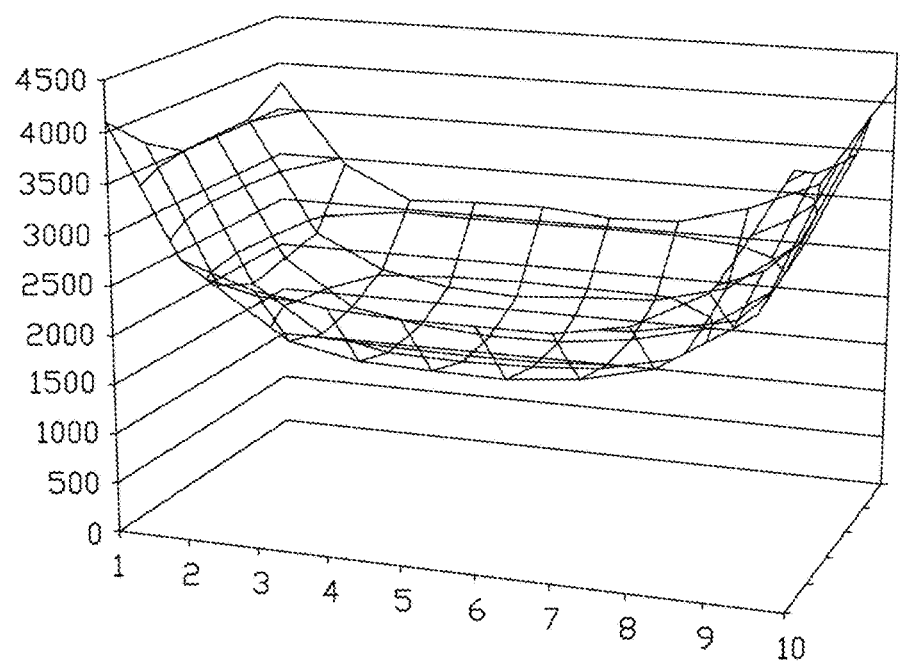
FIG. 16 shows the distribution of radial magnetic flux density of a NdFeB with N-polarized top surface.
Figure 17:
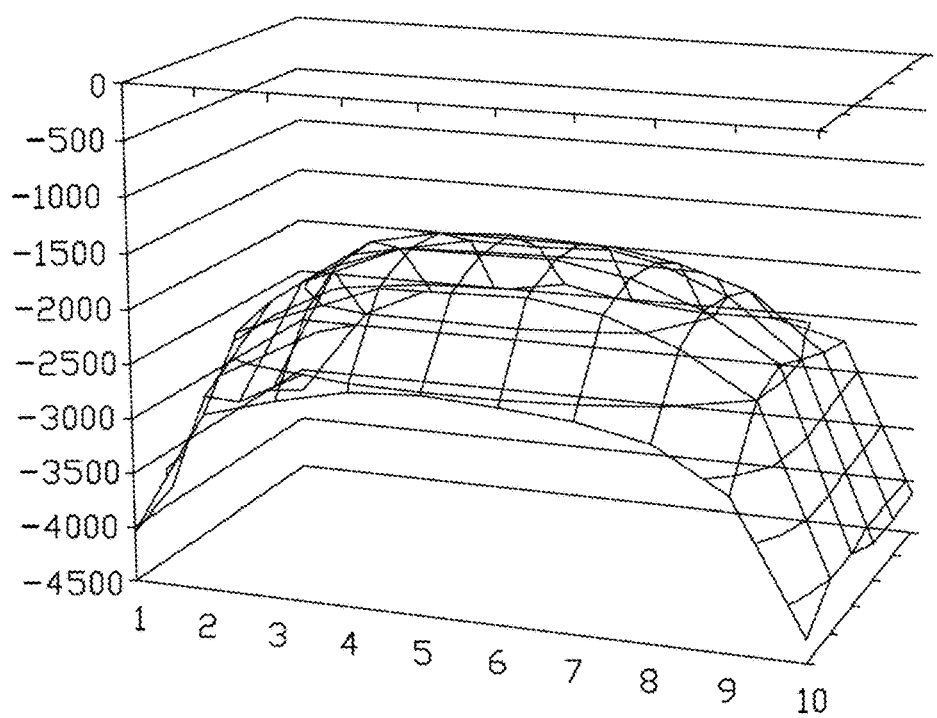
FIG. 17 shows the distribution of magnetic flux density of a NdFeB with S-polarized top surface.

The specific NdFeB magnets used for the disk-type motor is shaped with curved surfaces to engage the periphery of the rotor of FIG. 2. The magnetic flux density in the radial direction can be measured along the curved top surface of the magnet. FIG. 14 shows the specific NdFeB magnet 1411 with a curved top surface, and FIG. 15 shows that on the curved top surface are six sampling lines (dash lines), each of which has ten sampling points M0~M9 to be measured for the magnetic flux density. FIG. 16 and FIG. 17 show the measured magnetic flux density on the sampling points of the specific NdFeB magnets that has N polarity and S polarity on the top surface, respectively (plus value is denoted as N polarity and minus value as S polarity in Y-axis). When it comes to N-polarized top surface of the specific magnet, the radial flux density distributes in a manner that flux density increases upwards substantially along the surface edge and reaches a bottom value near the middle portion. When it comes to S-polarized top surface of the specific magnet, the radial flux density distributes in a reverse manner that flux density increases downwards substantially along the surface edge.

If only one line on the top surface is sampled in measurement of radial magnetic flux density, the resultant radial flux density distribution has two substantially higher value on both edges of each magnet in the circumferential direction than the middle portion.

Figure 18:
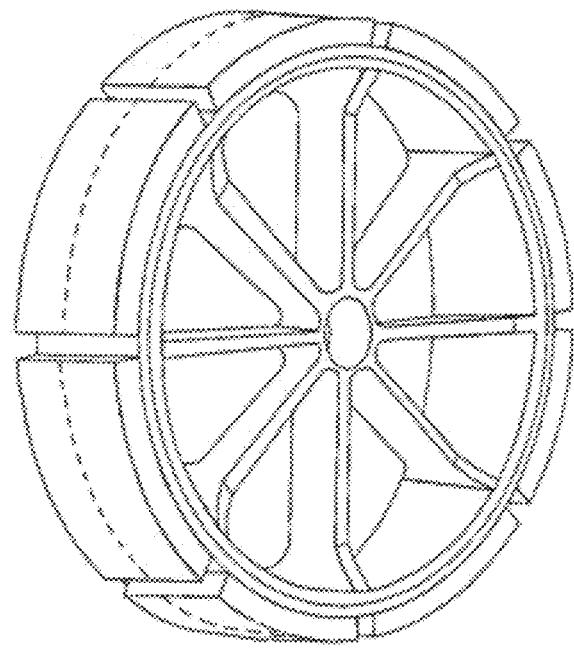
FIG. 18 shows a rotor arranged with eight NdFeB magnets over it, where the measurement of magnetic flux density is sampled along the dash line.
Figure 19:
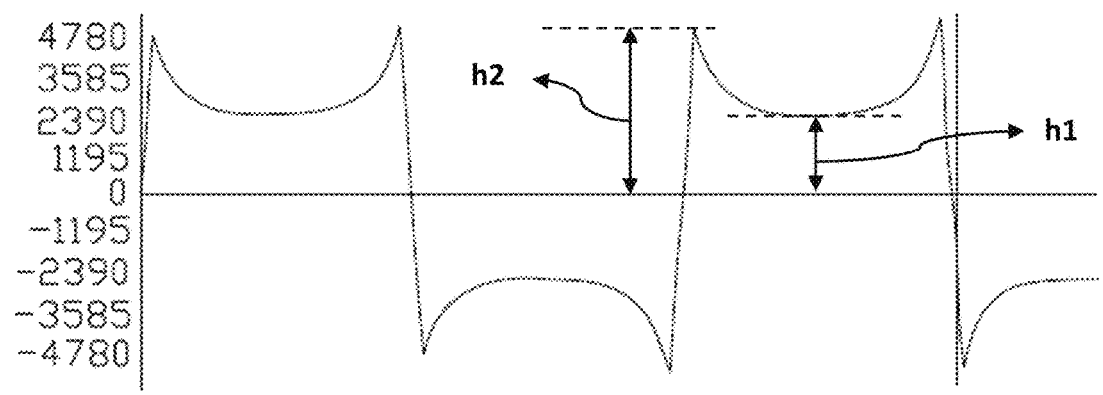
FIG. 19 shows the distribution of the magnetic flux density measured by sampling along the dash line shown in FIG. 18.

FIG. 19 shows flux density distribution along the dash line (FIG. 18) across surfaces of eight specific NdFeB magnets arranged around a rotor, in which the radial flux density distribution can be marked with a substantially higher value on the both edges than the middle portion along the circumferential direction as illustrated in FIGS. 17 and 18. In FIG. 19, h1 is denoted as the flux density magnitude in the middle portion and h2 is denoted as the flux density magnitude at either edge for the specific NdFeB magnet.

In a single-phase controlled motor system, the radial magnetic flux density that distributes in a waveform having a higher value on both edges than the middle portion of each magnet is beneficiary to power loss reduction.

Figure 20:
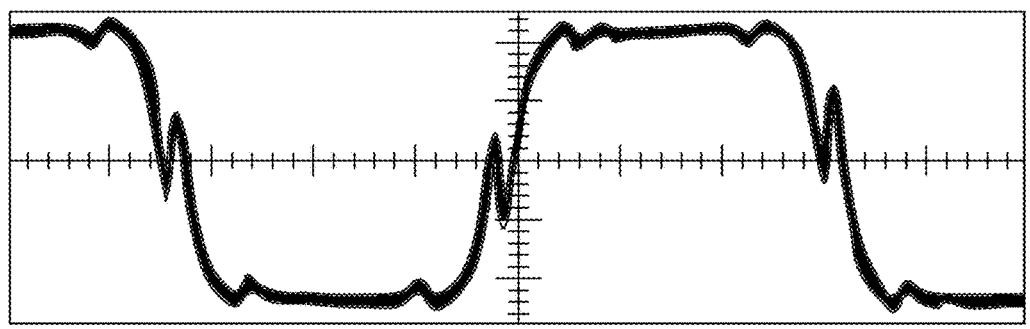
FIG. 20 shows a back electromotive force wave derived from the magnetic flux density as shown in FIG. 19.
Figure 21:
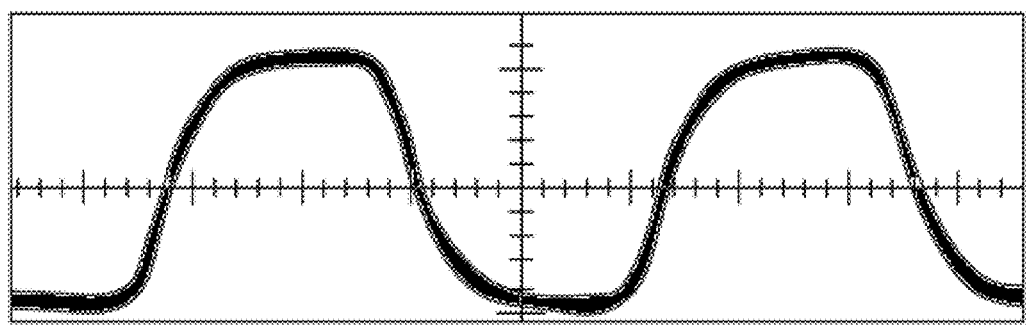
FIG. 21 shows a back electromotive force wave induced by a rotor provided with conventional permanent magnets.

The specific NdFeB permanent magnets that are characterized by magnetic flux density having higher value at both edges than the middle portion can be referred to as dual-peak magnets. In one embodiment of the disclosure, the dual-peak magnets are employed as the poles of the disk-type motor. FIG. 20 shows the back electromotive force (emf) derived from the radial flux density of the dual-peak magnets. Back emf is the magnetic induction voltage produced on coil windings due to magnetic flux of a rotating magnetic rotor. Conventional permanent magnets as the poles of a motor typically induce the back emf signal more like a trapezoid wave as show in FIG. 21. However, the back emf signal induced by the dual-peak magnets as the poles approximates to a square-wave signal. As a result of the magnetic flux density that has a substantially higher value at both edges than the middle portion, the back emf in a waveform more like a square wave due to this specific flux density can be induced. For single-phase controlled motor system, back emf signal that resembles a square wave can cause less power loss, thereby increasing power transfer efficiency.

With reference to FIG. 19, the magnitude h2 of flux density may be significantly higher than the magnitude h1 for the purpose of inducing a square-wave back emf. In embodiments of the disclosure, the flux density h2 at the both edges can be 1.5 to 2 times larger than h1 at the middle portion. Also, h2 may not be smaller than 1.33h1; otherwise, the square waveform of the back emf may be distorted seriously.

Since a dual-peak magnet serving as a pole has high magnetic flux density marked on both edges thereof, the thickness d of boot portion of the stator core (which has been shown in FIG. 12) is configured to be thick enough to sustain the peak flux density value of the dual-peak magnets without magnetic saturation.

Figure 22:
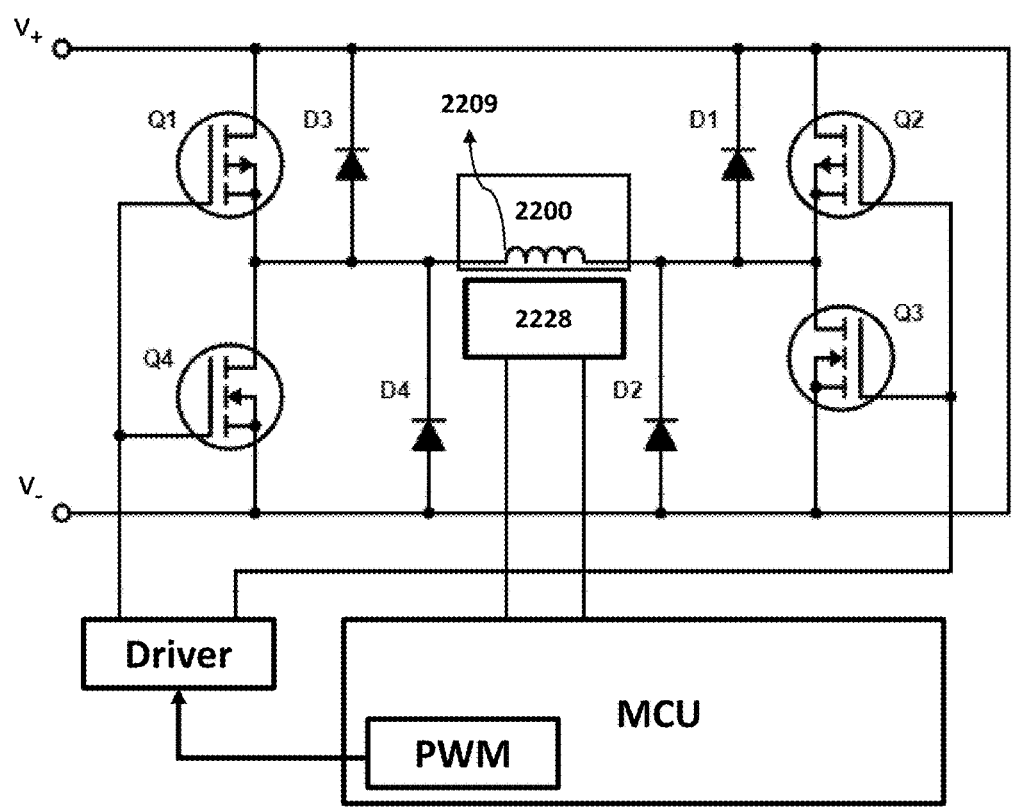
FIG. 22 shows a single phase control circuit diagram for a disk-type motor according to one embodiment of the disclosure.

FIG. 22 shows the single-phase control circuit diagram which comprises a disk-type motor 2200, a rotor position sensor 2228 for sensing the initial position of the rotor, a switching converter circuit that includes 4 MOSFETs Q1~Q4 and 4 corresponding diodes D1~D4, a microcontroller (MCU) that includes a pulse width modulation (PWM) module, and a Driver. The disk-type motor 2200 further has series connected coil windings 2209 (which is only shown for illustrative purpose in FIG. 22). The rotor position sensor 2228 sends the position signal representative of the rotor position to the MCU, and the position signal processed through the MCU is sent to the PWM module. The PWM module generates PWM signals to further control the on/off states of the MOSFETs Q1~Q4 via the Driver.

Figure 23:
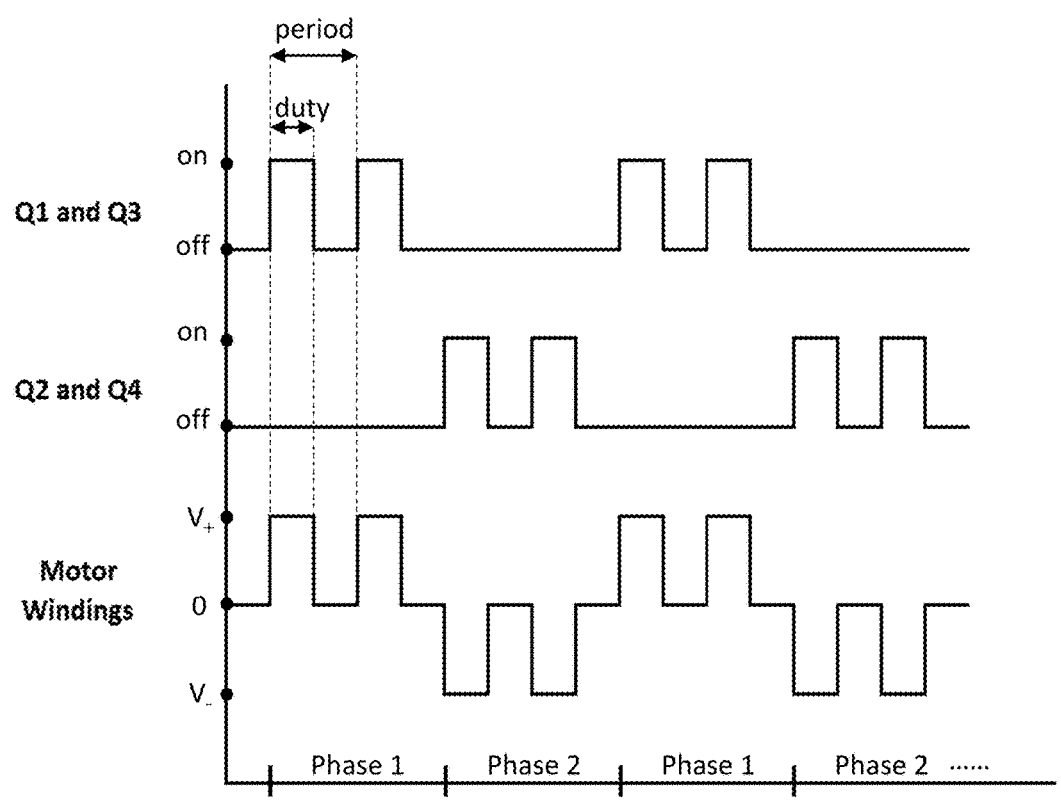
FIG. 23 shows the waveforms of PWM signals input to a switching converter circuit and a driving signal for driving a coil winding according to one embodiment of the disclosure.

FIG. 23 shows the PWM signals input to MOSFETs Q1~Q4 of the switching converter circuit and the voltage signal the coil winding receives in operation. According to the PWM signals, there are two phases of operation: phase 1 and phase 2. During the phase 1 operation, the PWM signals switch on Q1 and Q3 while Q2 and Q4 stay switched off. Therefore, in phase 1, the current of series connected windings 2209 flows in the direction from Q1 to Q3. During the phase 2 operation, PWM signals switch on Q2 and Q4 and turn Q1 and Q3 off. Therefore, in phase 2, the current of series connected windings 1309 flows in the direction from Q2 to Q4. Due to the direction of current flow determined by on/off states of Q1~Q4, each of the coil windings driven by the driving signal generated with the single phase control scheme switches the magnetic polarity between phase 1 and phase 2 as shown in the bottom of FIG. 23. In single phase control scheme, the supplied voltage is a single DC source and the driving signal for driving each of the coil windings is controlled by the PWM signal with the application of the single DC source. For the driving signal, switching time from one phase to the other can be defined by the transition edge of the driving signal where the polarity is reversed.

The input power of a motor is determined by the PWM control signals. As shown in FIG. 23, the turn-on time of a MOSFET can be referred to as duty time in one period of the PWM signals. The power received by the motor from the PWM module depends on the duty time; therefore, the motor input power can be increased with longer duty time.

The single-phase driven motor according to one embodiment of the disclosure has the advantage that all series connected coil windings can contribute to the output torque at any instant during operation.

In a further embodiment of the disclosure, the coil windings in the motor can have a plurality of subsets, each of which can be driven by a current source of difference phases. Therefore, multi-phase controlled motor system also can be applied to the disk-type motor as well, like a three phase controlled motor.

Figure 24:
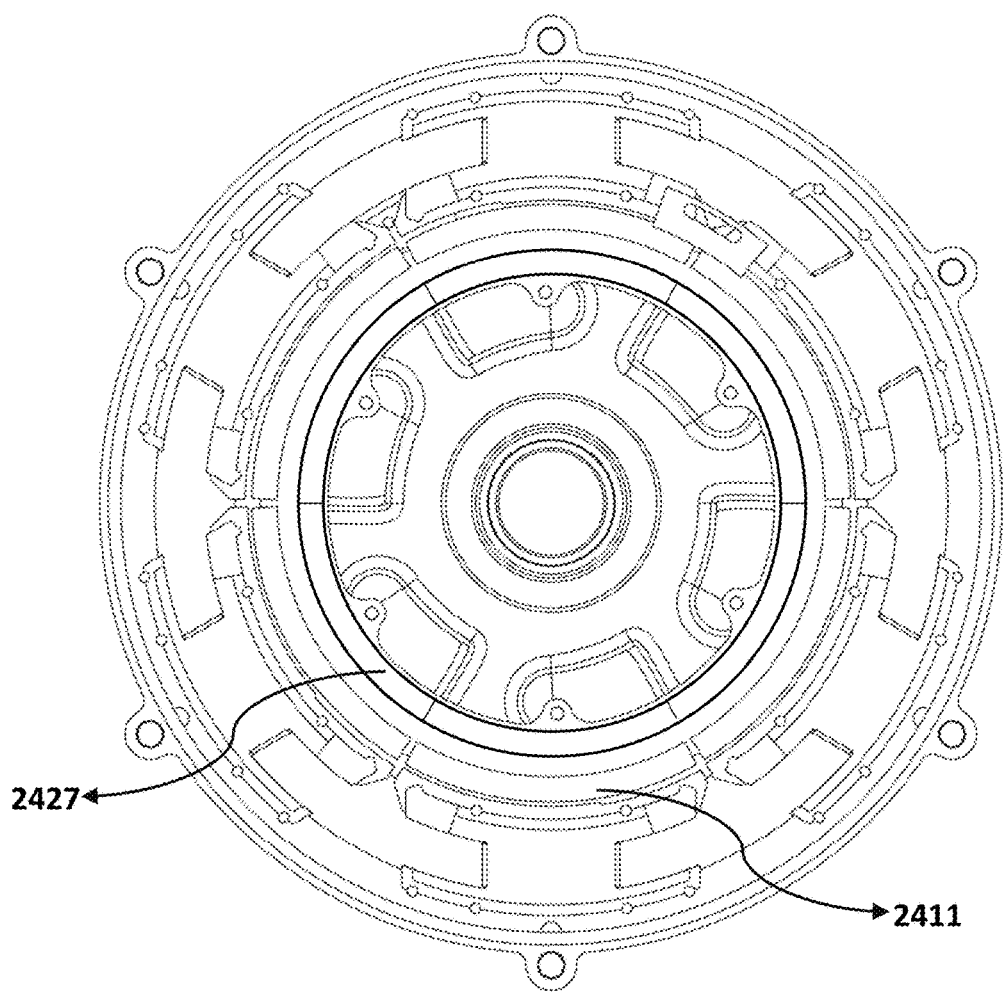
FIG. 24 shows the angular positions on which a Hall sensor can be mounted according to one embodiment of the disclosure.

As described in the preceding paragraphs, a rotor position sensor as control signal is required for controlling a motor. The rotor position sensor serves to sense the rotor position which is to be transformed into electronic signals by a microcontroller for further controlling. There are many types of rotor position sensors that can be employed in the disclosure. An optical sensor can be used to directly sense the rotor position optically. In addition, a Hall sensor mounted inwardly on the motor casing can be used to directly sense the magnetic field produced by the permanent magnets of the rotor. According to the magnetic field sensed by the Hall sensor, the information of rotor position can be collected as an input signal to the microcontroller for further motor controlling. FIG. 24 shows two implementations of Hall sensing. In one implementation, the Hall sensor is configured to directly sense the position of magnets 2411 of the rotor. In another implementation, an additional magnet ring 2427 having the same polarity as the rotor is mounted on the shaft, and the Hall sensor is configured to sense the ring 2427 as the basis of the position information. As the motor starts operating, the Hall sensor senses the position of the magnets as the information of the rotor position for further motor controlling.

In operation, the motor output characteristics, such as torque and rotation speed, need to be adjusted dynamically with different circumstances. For example, as an electrically driven vehicle runs on road, the motor may be able to switch between high torque and low torque modes adaptively for the varying slope of road.

Under the same input voltage received by a motor, the motor output characteristics can be changed by adjusting an advance angle which can be determined by a phase difference between the driving signal for driving a coil winding and a back electromotive force signal induced on the coil winding. The driving signal of coil winding in general corresponds to the signal for driving the MOSFETs as shown in FIG. 23. The back emf signal is magnetic induction voltage induced on coil windings due to magnetic flux of a rotating magnetic rotor. The advance angle is used to measure the degree by which the driving signal leads ahead of the back emf signal.

In addition, motor output characteristics can be associated with specific advance angles. Torque as one motor output characteristic, for example, can be enhanced by adjusting the phase difference to a specific advance angle (or a specific range of advance angles) during the motor operation instead of increasing input voltage. The advance angle which specifically corresponds to the high torque or high speed performance can be pre-defined and stored in a motor control system. Therefore, the motor control system can be configured to operate the motor with various motor output characteristics corresponding to different torque and speed modes by adjusting the phase difference to match the pre-defined advance angles.

Figure 25:
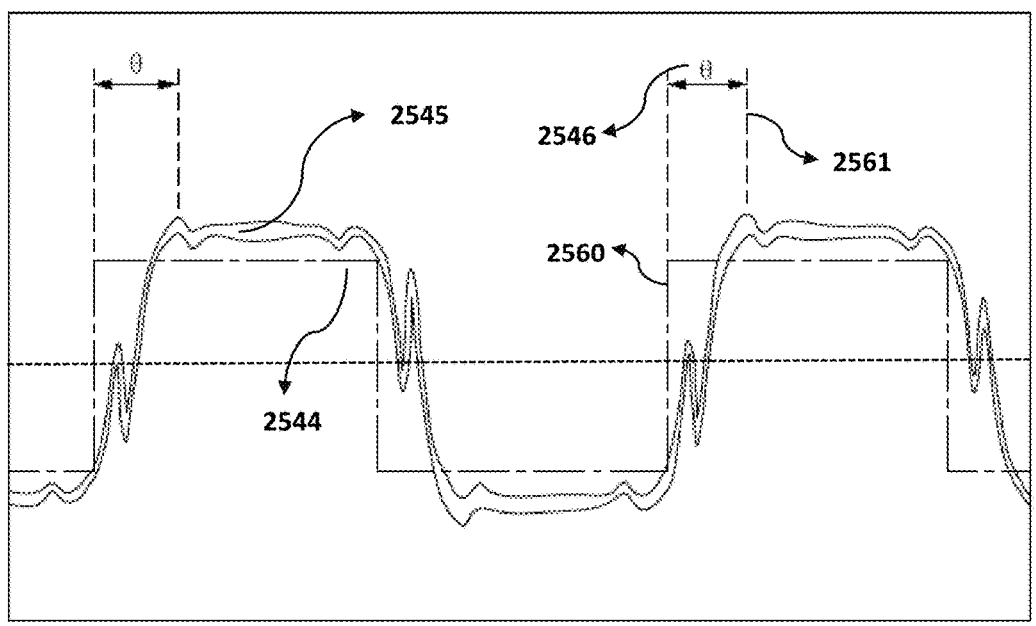
FIG. 25 shows the waveforms of a driving voltage signal for driving coil windings in the disk-type motor and a back emf signal induced on the coil windings.

FIG. 25 shows driving signal 2544 received by a coil winding and back emf signal 2545 measured on the coil winding, in which the phase difference θ between these two signals is advance angle 2546. With reference to FIG. 25, it is straightforward that the current advance angle has the degree θ by which the switching time 2560 between phase 1 and phase 2 operations leads ahead of the transition edge 2561 of the back emf signal. Therefore, the control over the switching time of driving signal can manipulate the advance angle in a single-phase controlled motor system.

Figure 26:
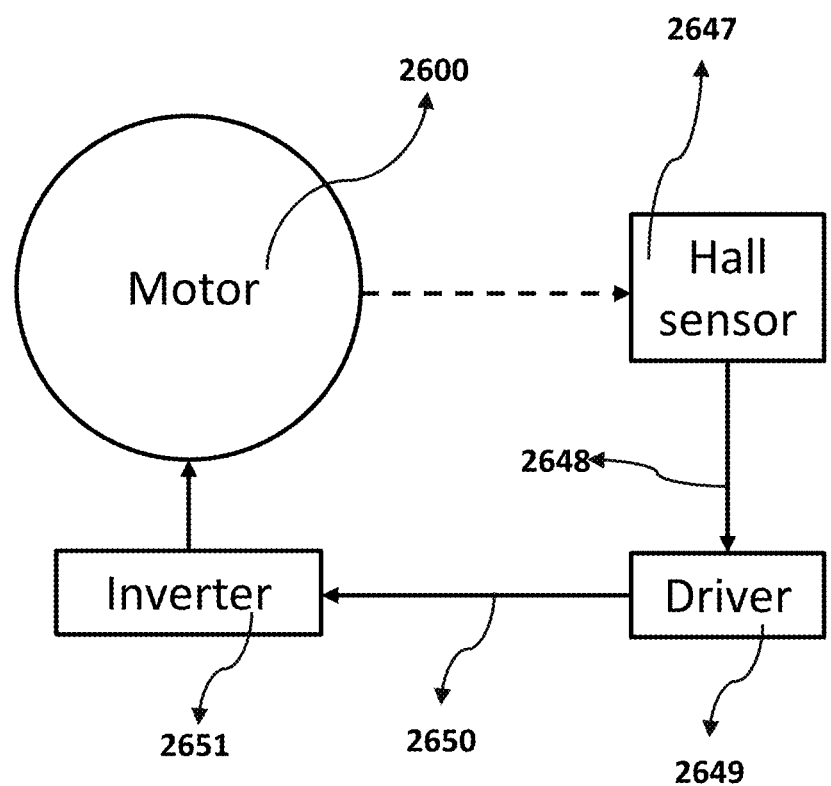
FIG. 26 shows a block diagram representative of a circuit loop for a single-phase controlled motor system.

There are a plurality of implementations to control the switching time of a driving signal. According to one embodiment of the disclosure, moving the Hall sensor to different angular positions with respect to the motor shaft can shift the switching time. FIG. 26 shows a block diagram representative of a circuit loop for a single-phase controlled motor system. Hall sensor 2647 outputs and sends Hall sensing signal 2648 indicating the rotor angular position to Driver 2649 and triggering the generation of a driving signal 2650 from Driver 2649 to drive the coil windings in motor 2600 via inverter 2651. In order for the control system to adjust advance angle to a required degree, switching time has to be shifted depending on the propagation time taken for Hall sensing signal 2648 from Hall sensor 2647 to Driver 2649. This propagation time for the Hall sensing signal can depend further on the relative angular position of the Hall sensor to the motor shaft.

Figure 27A:
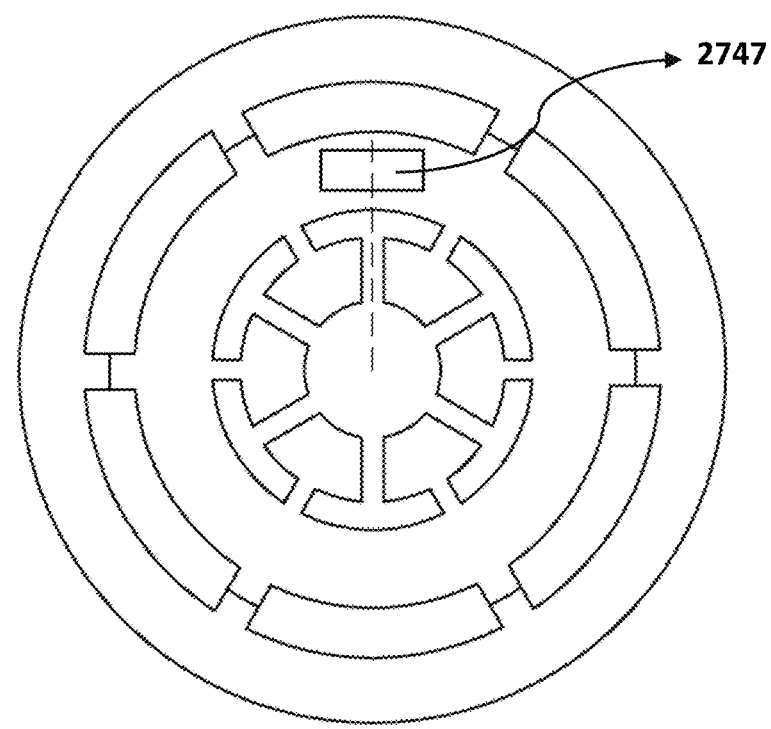
FIGS. 27A and 27B show, respectively, two different angular positions on which a Hall sensor can be mounted to change the propagation time taken for Hall sensing signal to be transferred from the Hall sensor to a driver.
Figure 27B:
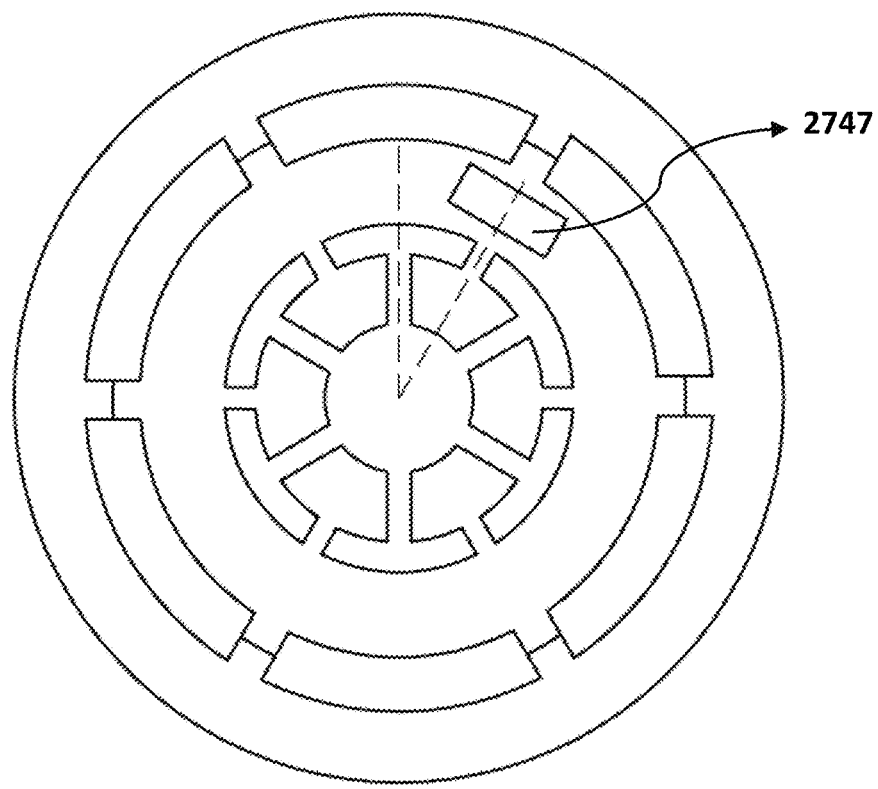

In FIG. 27A and FIG. 27B, Hall sensor 2747 are mounted to a first angular position and a second angular position, respectively. An electric mechanism can be employed to attach Hall sensor 2747 onto a rail which extends circumferentially and to move the sensor along the rail to the first or second angular position via an activator. As the Hall sensor moves to different angular positions, the switching time of the driving signal shifts accordingly with respect to the back emf signal because Hall sensing signal takes different time to propagate to the driver. Furthermore, in the case where the motor output characteristics stay unchanged during the operation, the angular position of the Hall sensor can be fixed with respect to the shaft so as to maintain a constant advance angle.

Figure 28:
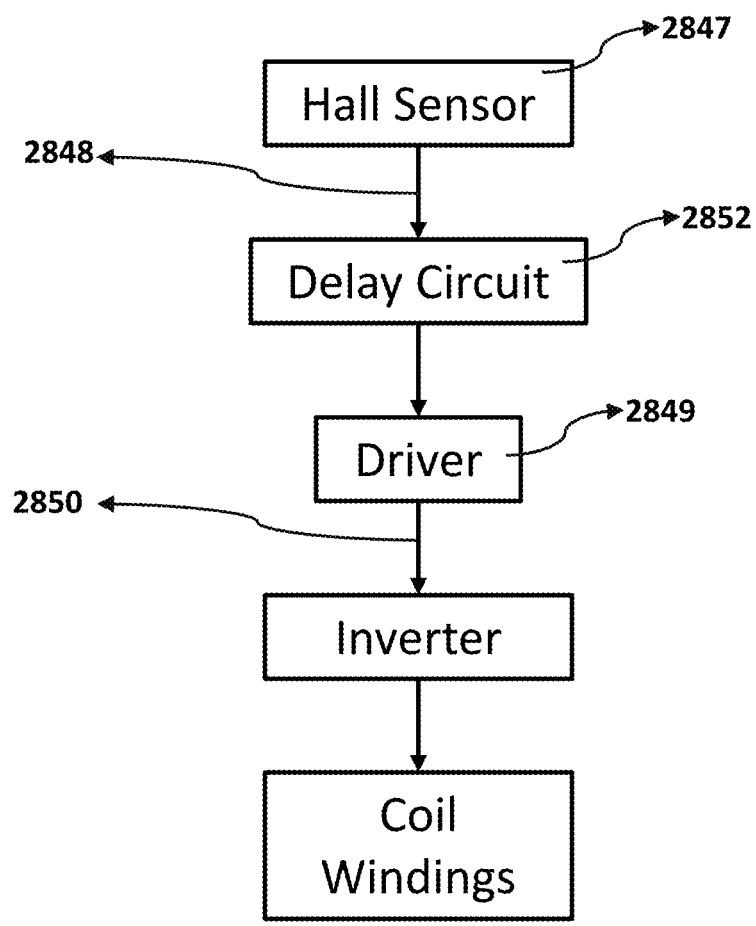
FIG. 28 shows a block diagram representative of switching time control by delaying Hall sensing signal according to one embodiment of the disclosure.

Alternatively, delaying signal propagation from a Hall sensor to a motor enables shifting of the switching time of a driving signal. FIG. 28 shows a block diagram representative of switching time control by delaying Hall sensing signal.

In FIG. 28, Hall sensing signal 2848 is delayed by a delay circuit 2852 and transferred to Driver 2849, followed by a phase shift of driving signal 2850 produced by the Driver 2849. The operational advance angle is modified as a result of the phase shift of the driving signal. The time for the Hall sensing signal to be delayed determines the degree of advance angle to be adjusted. The addition of a delay circuit for the Hall sensing signal allows adjustment of the advance angle without moving the Hall sensor during the operation.

Figure 29:
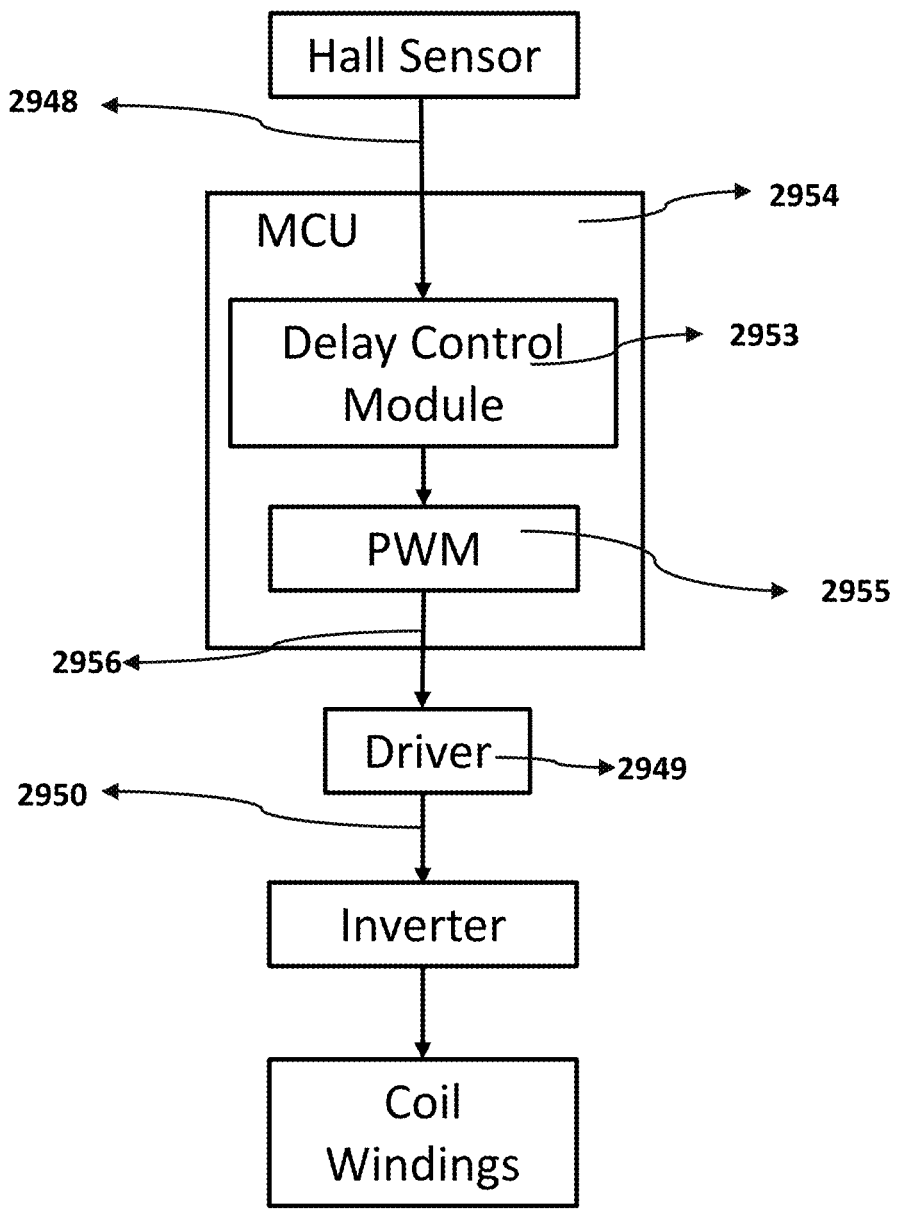
FIG. 29 shows a block diagram representative of switching time control by delaying Hall sensing signal according to another embodiment of the disclosure.

FIG. 29 shows another block diagram representative of switching time control by delaying Hall sensing signal. Hall sensing signal 2948 is firstly sent to a microcontroller unit (MCU) 2954 which includes a delay control module 2953 to delay the Hall sensing signal. Subsequent to the delayed Hall sensing signal being input to PWM module 2955, the PWM module produces PWM signal 2956 to Driver 2949. A driving signal 2950 is generated via Driver 2949 and the advance angle is adjusted accordingly through this signal delaying by the delay control module.

Instead of delaying Hall sensing signal to achieve the proper adjustment of an advance angle, PWM signal with a lagging phase controlled by a delay control module in a MCU enables the switching time of the driving signal to shift so as to make the advance angle required for a specific motor output characteristics.

Figure 30:
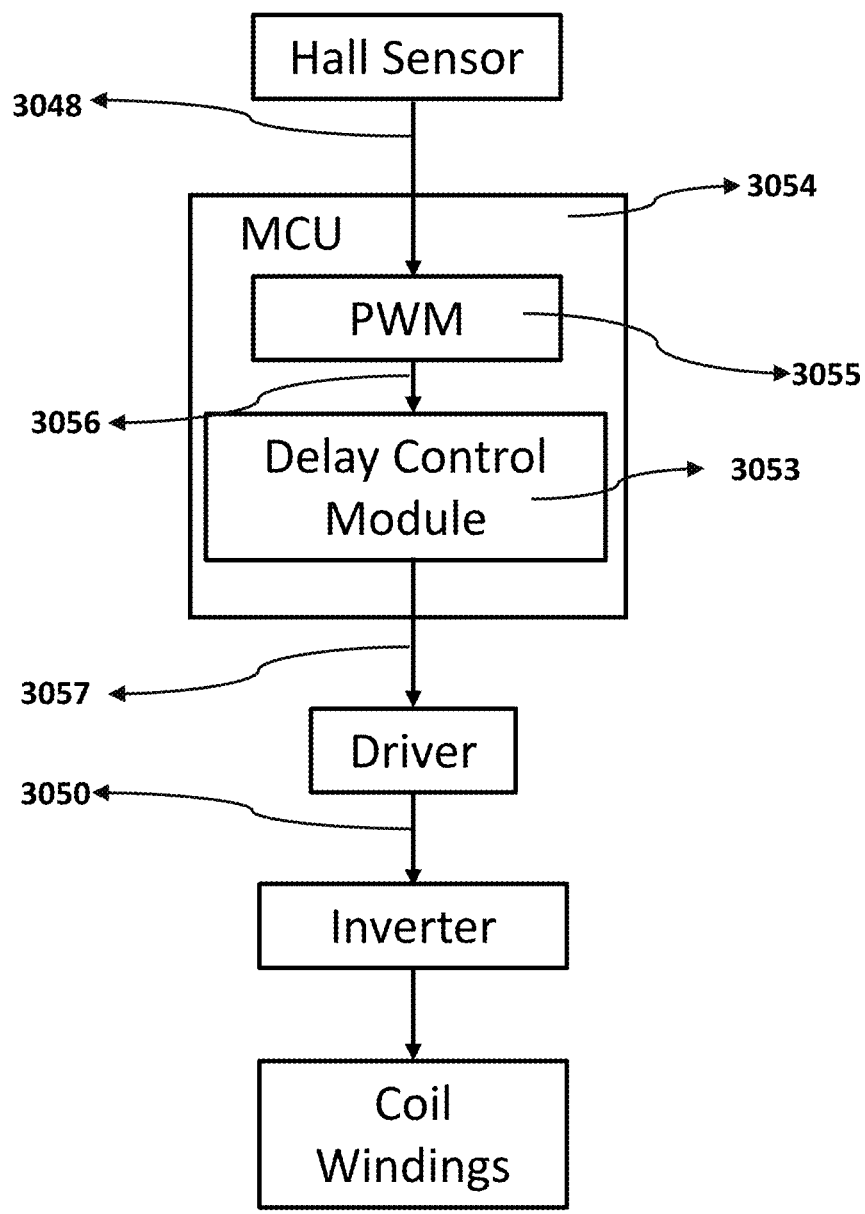
FIG. 30 shows a block diagram representative of controlling PWM signal with a lagging phase according to one embodiment of the disclosure.

FIG. 30 shows a block diagram representative of controlling PWM signal with a lagging phase. Hall sensing signal 3048 is sent to PWM module 3055 in MCU 3054 to produce PWM signal 3056, and this PWM signal is delayed to have its phase changed by delay control module 3053. Driving signal 3050 generated based on the delayed PWM signal 3057 has the switching time that advances the back emf signal by the required advance angle.

Figure 31:
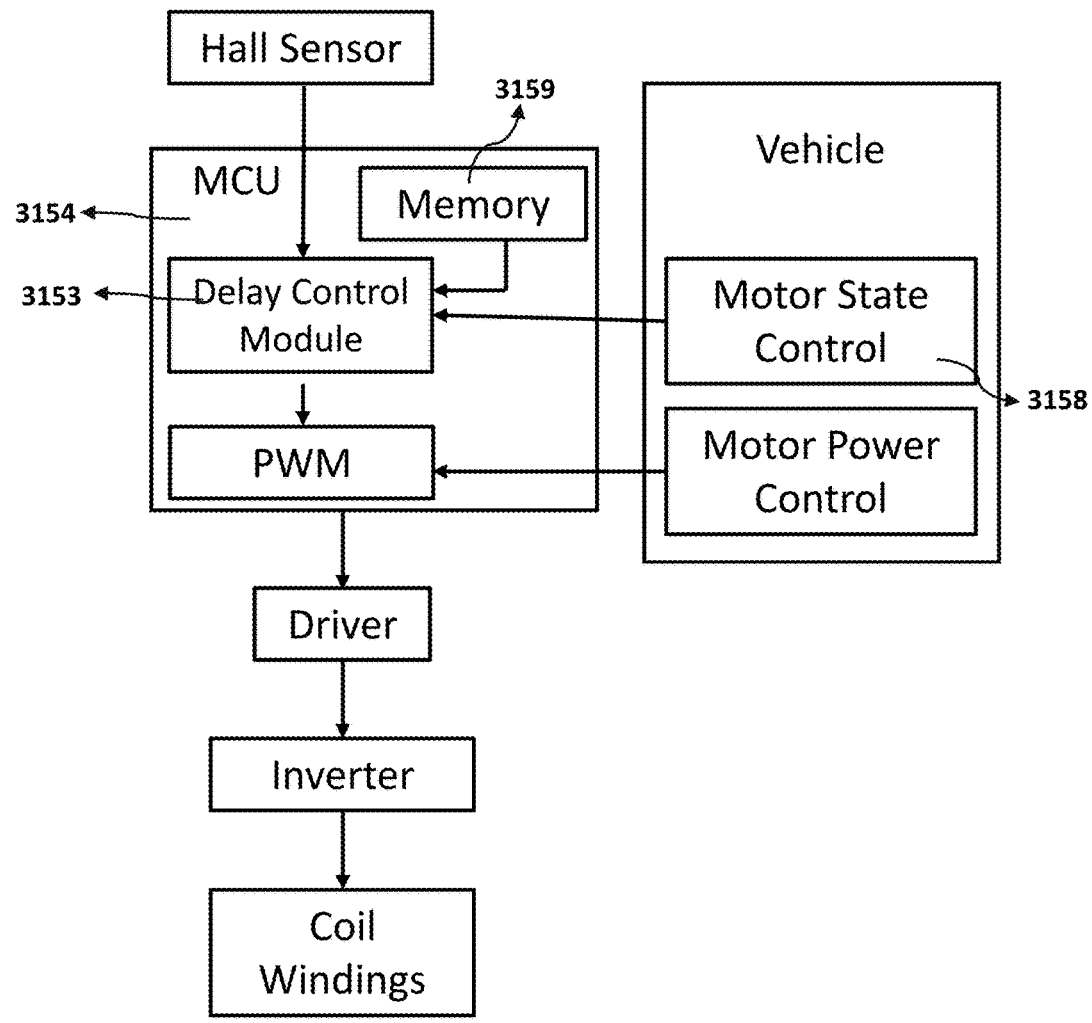
FIG. 31 shows a block diagram representative of the motor system with a function to adjust advance angles according to one embodiment of the disclosure.

The extent to which the signal propagation should be delayed is dependent of the required motor output characteristics. A single-phase controlled motor system can be configured to have a storage that stores the data of specific advance angles associated to the motor output characteristics optional for operation and to have a controller that manipulates the delay time of the driving signal such that the current advance angle is adjusted to the specific advance angles of which the data can be fetched from the storage. FIG. 31 shows a block diagram representative of a single-phase controlled motor system with a function to adjust advance angles according to one embodiment of the disclosure. Motor state control 3158 receives command signal which can be generated from a vehicle driver, an interface, an advanced driver assistance system (ADAS), connected car internet or other sensors. The command signal indicating certain motor output characteristics (e.g. high torque or high speed) are required for current operation is sent to delay control module 3153 in MCU 3154. Upon receipt of the command signal by the delay control module, the MCU can select the advance angle data corresponding to the required motor output characteristics from Memory 3159 and transfer the selected advance angle data to the delay control module. Based on the selected advance angle data, the driving signal for driving coil winding can be delayed with a phase shift corresponding to the advance angle.

It should be noticed that the method to adjust advance angle is illustrative and not limited to the embodiment described in the disclosure. Any methods to adjust advance angle for changing the motor output characteristics during motor operation should be regarded as not departing from the broader spirit and scope of the disclosure as set forth above.

As one exemplary embodiment of the disclosure, the disk-type motor can be applied to two-wheeled electrically driven vehicle, which can improve the energy consumption under the conditions where high torque force is demanded for the two-wheeled electrically driven vehicles. Therefore, a smaller sized battery system can be utilized without compromising between the torque force and the range of the vehicles.

Figure 32:
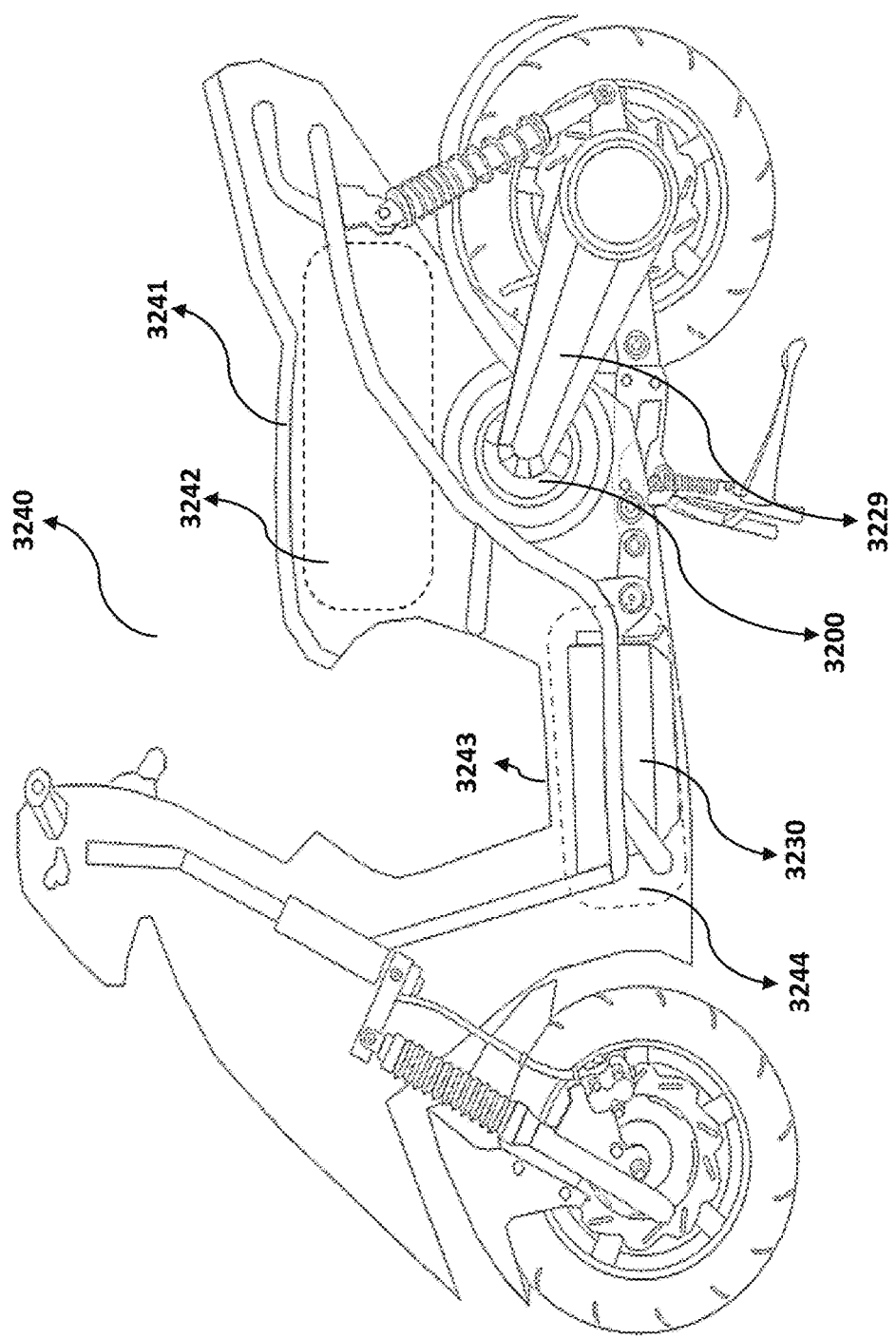
FIG. 32 shows a side view of an electrically driven vehicle according to one embodiment of the disclosure.

FIG. 32 shows the side view of a two-wheeled electrically driven vehicle 3240 with the disk-type motor 3200. In FIG. 32, a battery system 3230 can be installed in the limited space (indicated by the dash lines) below footrest panel 3243 except for the conventional space (indicated by the dash lines) in a storage box 3242 below seat 3241. The disk-type motor 3200 is disposed in the vehicle body; in other words, the disk-type motor 3200 can be disposed below the seat 3241 and near the rear side of the battery system 3230.

Figure 33:
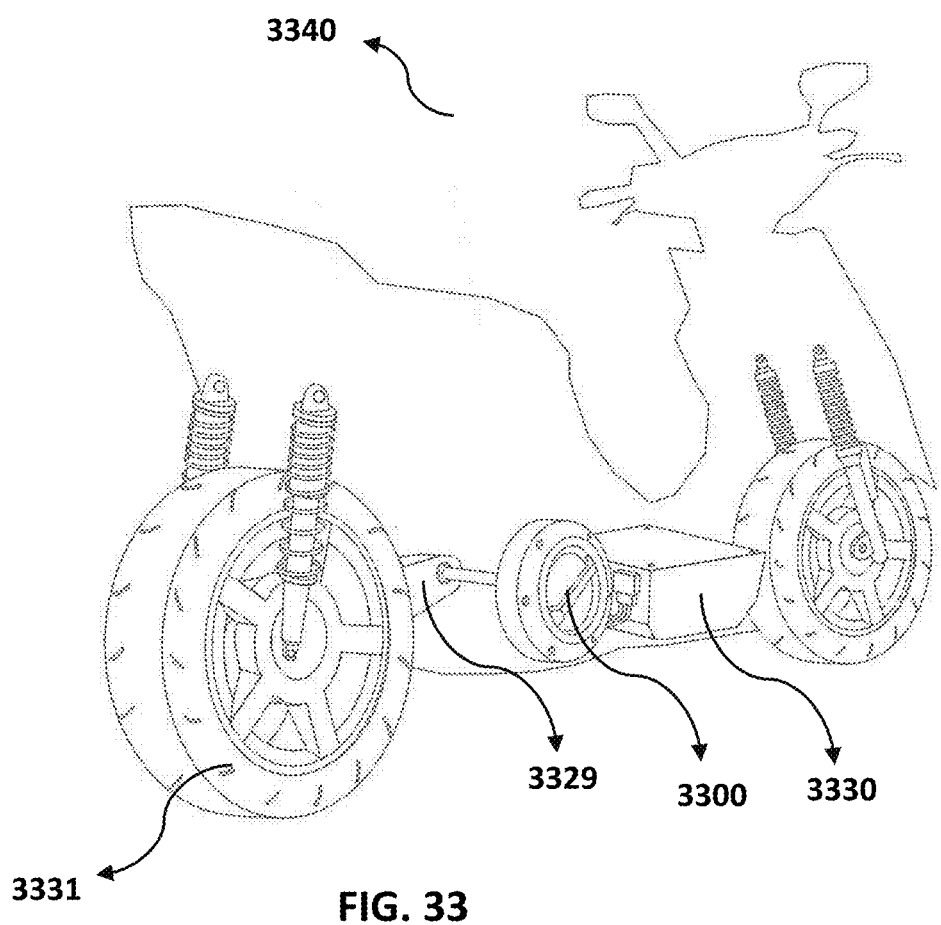
FIG. 33 shows a perspective representation of an electrically driven vehicle according to another embodiment of the disclosure.

FIG. 33 shows the perspective representation of the electrically driven vehicle 3340 that the disk-type motor 3300 is installed within the vehicle body. The disk-type motor 3300 is positioned at the rear end of the battery system 3330 and coupled to a transmission 3329. In operation, the motor 3300 drives the rear wheel 3331 via the transmission 3329.

Figure 34:
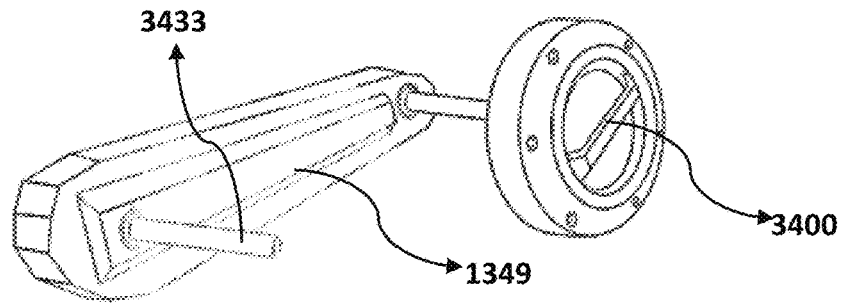
FIG. 34 and FIGS. 34A-34C show various transmissions that can be applied to an electrically driven vehicle according to embodiments of the disclosure.
Figure 34A:
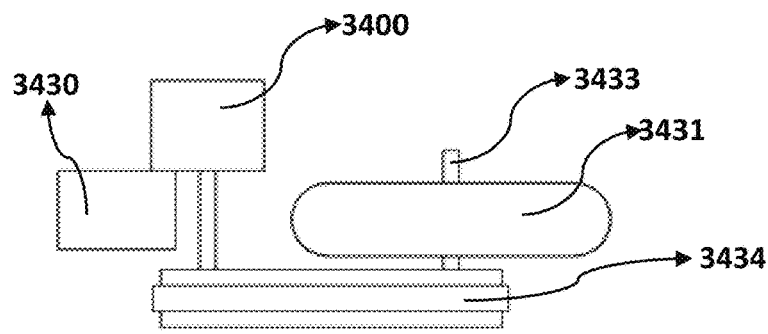
Figure 34B:
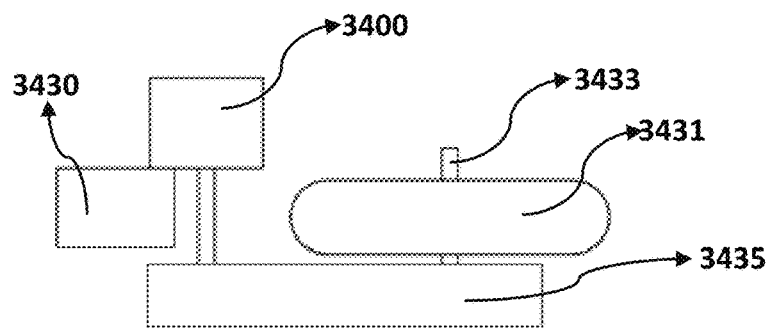
Figure 34C:
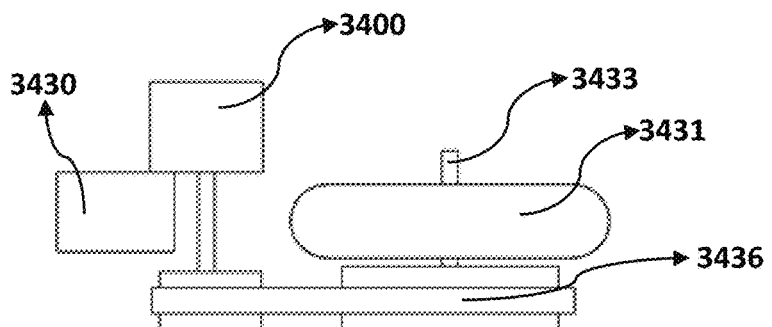

FIG. 34 shows the transmission system of the electrically driven vehicle as shown in FIG. 33. The motor 3400 is connected to the axle 3433 of the rear wheel via the transmission 3429. FIG. 34A~C show the top view diagrams of the configurations using various transmission. In one embodiment of the disclosure, a continuously variable transmission 3434 can be applied. In another embodiment of the disclosure, a gearbox transmission 3435 can be used. In a further another embodiment of the disclosure, a belt transmission 3436 can be used as the transmission.

Figure 35:
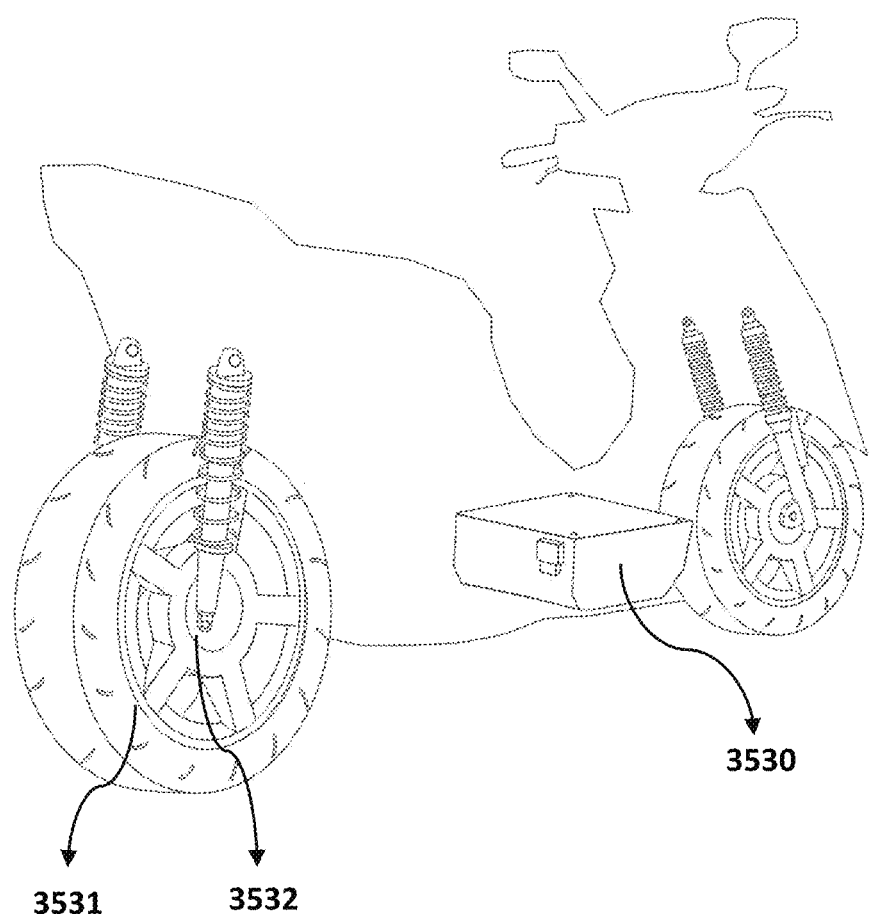
FIG. 35 shows a perspective representation of an electrically driven vehicle according to a further embodiment of the disclosure.
Figure 36A:
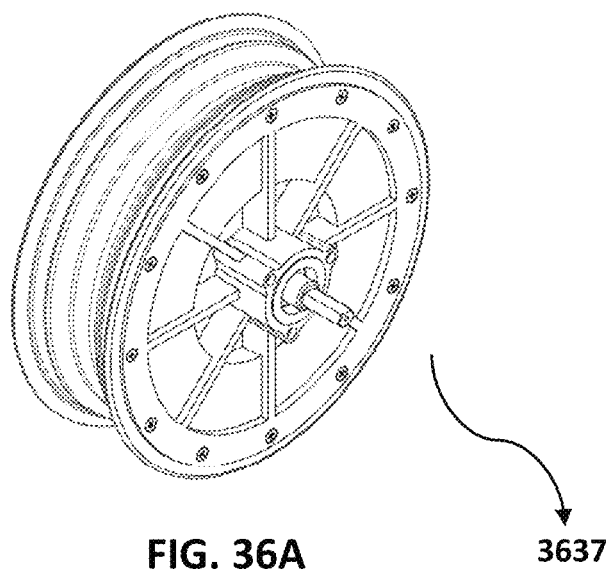
FIGS. 36A and 36B show a wheel hub motor according to a further another embodiment of the disclosure.
Figure 36B:
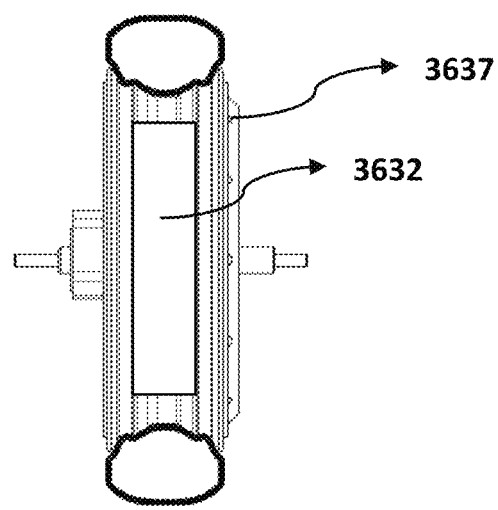

In another embodiment of the disclosure, the disk-type motor can be installed in the hub of the rear wheel. FIG. 35 shows a wheel hub motor 3532, in which the disk-type motor can directly drive the rear wheel 3531 during operation. FIG. 36A shows the outlook of the wheel hub motor 3632 being directly installed in the hub of the wheel 3637, and FIG. 36B shows the sectional view of FIG. 36A.

According to embodiments of the disclosure, the power efficiency of the disk-type motor can reach as high as 85~90% compared to the conventional motors which at most only reach about 85% efficiency, and the disk-type motor can generate output power in a wide range from 500 W to 10 kW. With the wide range of output power, the disk-type motor can be applied not only to wheeled vehicles such as two-wheeled vehicles, three-wheeled vehicles and four-wheeled vehicles of about 10 kW, but also to non-terrestrial vehicles such as unmanned aerial vehicles (UAVs) and devices equipped with propellers. Also, since the permanent magnets used in the disclosure has great thermal resistivity, the disk-type motor can operate quite well even under a high temperature environment.

Although the disclosure has been described with reference to specific exemplary embodiments, it will be evident that various modification and changes can be made to these embodiments without departing from the broader spirit and scope of the disclosure as set forth above. Accordingly, the specification and drawings are to be regarded in an illustrative rather than a restrictive sense.

What is claimed is:

1. A disk-type electric motor, comprising:
    a magnetic rotor having a rim and a plurality of equally spaced magnetic poles around the rim; and
    a stator having a stator core that includes tooth portions and boot portions and a plurality of series connected coil windings,
    wherein the plurality of series connected coil windings are driven by a driving signal with a single phase control scheme to produce an electromagnetic field of alternating polarity,
    each of the magnetic poles comprises a permanent magnet, and a radial magnetic flux density of the permanent magnet on a radial outer surface of the permanent magnet is substantially higher at both edges than a middle portion along a circumferential direction of the magnetic rotor.

2. The disk-type electric motor of claim 1, wherein the radial magnetic flux density substantially higher at the both edges, than the middle portion induces, on the coil windings, a back electromotive force (emf) signal approximating to a square wave such that the back emf signal in conjunction with the driving signal with the single phase control scheme reduces power loss.

3. The disk-type electric motor of claim 2, further comprising:
    a control circuit to adjust a phase difference by which the driving signal leads ahead of the back emf signal.

4. The disk-type electric motor of claim 1 wherein the boot portions are configured to sustain the radial magnetic, flux density at the both edges of the magnetic poles.

5. The disk-type electric motor of claim 1, wherein the number of the coil windings is equal to that of the magnetic poles.

6. The disk-type electric motor of claim 1, wherein each of the boot portions has a first air gap on a first pan and a second air gap which is larger than the first air gap on a second part from the magnetic poles, the second part having shorter arc length than the first part.

7. The disk-type electric motor of claim 1, wherein the magnetic poles are provided with R—Fe—B magnets, R being rare-earth metals, Fe being iron, B being boron.

8. The disk-type electric motor of claim 1, wherein a radial diameter of the magnetic rotor is larger than an axial thickness thereof.

9. An electrically driven vehicle, comprising:
    at least two wheels;
    a single-phase control circuit; and
    a disk-type electric motor, further comprising:
        a magnetic rotor having a rim and a plurality of equally spaced magnetic poles around the rim; and
        a stator having a stator core that includes tooth portions and boot portions and a plurality of series connected coil windings,
    wherein the plurality of series connected coil windings are driven by a driving signal generated by the single-phase control circuit to produce an electromagnetic field of alternating polarity,
    wherein each of the magnetic poles comprises a permanent magnet, and a radial magnetic flux density of the permanent magnet on a radial outer surface of the permanent magnet is substantially higher at both edges than a middle portion along a circumferential direction of the magnetic rotor.

10. The electrically driven vehicle of claim 9, wherein the radial magnetic flux density substantially higher at the both edges than the middle portion induces, on the coil windings, a back electromotive force (emf) signal approximating to a square wave such that the back emf signal in conjunction with the driving signal generated by the single-phase control circuit reduces power loss.

11. The electrically driven vehicle of claim 10, wherein the single-phase control circuit is further configured to adjust a phase difference by which the driving signal leads ahead of the back emf signal.

12. The electrically driven vehicle of claim 9, wherein the number of the coil windings is equal to that of the magnetic poles.

13. The electrically driven vehicle of claim 9, wherein the boot portions are configured to sustain the radial magnetic flux density at the both edges of the magnetic poles.

14. The electrically driven vehicle of claim 9, wherein each of the boot portions has a first air gap on a first part and a second air gap which is larger than the first air gap on a second part from the magnetic poles, the second part having shorter arc length than the first part.

15. The electrically driven vehicle of claim 9, wherein the magnetic poles are provided with R—Fe—B magnets, R being rare-earth metals, Fe being iron, B being boron.

16. The electrically driven vehicle of claim 9, wherein a radial diameter of the magnetic rotor is larger than an axial thickness thereof.

17. A method for controlling a disk-type electric motor, wherein the BLDC motor includes a magnetic rotor having a rim and a plurality of equally spaced magnetic poles around the rim and a stator having a stator core that includes tooth portions and boot portions and a plurality of series connected coil windings, the method comprising:
    with a single phase control scheme, providing a driving signal for driving the plurality of series connected coil windings;
    in response to the driving signal, producing an electromagnetic field of alternating polarity; and
    via an interaction of the electromagnetic field with a radial magnetic flux density of the magnetic poles, rotating the magnetic rotor, wherein each of the magnetic poles comprises a permanent magnet, and the radial magnetic flux density of the permanent magnet on a radial outer surface of the permanent magnet is substantially higher at both edges than a middle portion along a circumferential direction of the magnetic rotor.

18. The method of claim 17, wherein a back electromotive force (emf) signal is induced on the coil windings, which approximates to a square wave such that the back emf signal in conjunction with the driving signal reduces power loss.

19. The method of claim 18, further comprising adjusting, by a control circuit, a phase difference by which the driving signal leads ahead of the back emf signal.

20. The method of claim 17, further comprising changing an input power to the disk-type electric motor by modulating a duty time of the driving signal with a pulse width modulation module.

* * * * *